US012721322B1

(12) United States Patent
Wang et al.

(10) Patent No.: US 12,721,322 B1
(45) Date of Patent: Sep. 1, 2026

(54) AUTOMATED ANIMAL WASTE COLLECTION SYSTEM

(71) Applicants: Shengkai Wang, Beijing (CN); Yuhan Wu, Beijing (CN); Xiaoshu Xiong, Beijing (CN); Pok Yuen Jim Wong, Beijing (CN); Chi Fui Ni, Shanghai (CN); Tianyi Wang, Beijing (CN); Jian Jim Wang, Belle Mead, NJ (US); Timothy Yang, Los Gatos, CA (US)

(72) Inventors: Shengkai Wang, Beijing (CN); Yuhan Wu, Beijing (CN); Xiaoshu Xiong, Beijing (CN); Pok Yuen Jim Wong, Beijing (CN); Chi Fui Ni, Shanghai (CN); Tianyi Wang, Beijing (CN); Jian Jim Wang, Belle Mead, NJ (US); Timothy Yang, Los Gatos, CA (US)

(73) Assignees: Sheng Wang, Beijing (CN); Yuhan Wu, Beijing (CN); Xiaoshu Xiong, Beijing (CN); Pok Yuen Wong, Beijing (CN); Chi Fui Ni, Shanghai (CN); Tianyi Wang, Beijing (CN); Jian Wang, Belle Mead, NJ (US); Timothy Yang, Los Gatos, CA (US)

( * ) Notice: Subject to any disclaimer, the term of this patent is extended or adjusted under 35 U.S.C. 154(b) by 0 days.

(21) Appl. No.: 19/541,417

(22) Filed: Feb. 17, 2026

(51) Int. Cl.
*B64U 101/00* (2023.01)
*A01K 29/00* (2006.01)

(52) U.S. Cl.
CPC ........ *A01K 29/005* (2013.01); *B64U 2101/00* (2023.01)

(58) Field of Classification Search
CPC .......................... A01K 29/005; B64U 2101/00
See application file for complete search history.

(56) References Cited

U.S. PATENT DOCUMENTS

2020/0150696 A1* 5/2020 Womble ............... A01K 29/005
2023/0034055 A1* 2/2023 Peterson .............. A01K 29/005

* cited by examiner

*Primary Examiner* — Scott A Browne
*Assistant Examiner* — Izcalli Rios-Aguirre
(74) *Attorney, Agent, or Firm* — Treasure IP Group, LLC

(57) ABSTRACT

An automated system for animal waste removal is disclosed. The system comprises a wearable monitoring assembly configured to be fitted to an animal for detecting an imminent waste elimination event. This assembly includes sensors to generate postural and physiological data, which is analyzed by a processor executing a predictive model to identify the event and transmit an alert signal with the animal's location. In response to the alert, an external autonomous aerial vehicle is dispatched. The vehicle features a waste collection mechanism that is configurable in a dual-mode capacity. An interceptive mode is employed for the direct capture of waste during elimination, while a retrieval mode is used to collect waste after it has been deposited. This dual-mode functionality provides a comprehensive, timely, and automated solution for animal waste collection in various environments.

20 Claims, 16 Drawing Sheets generating a high-fidelity data stream indicative of the animal’s physiological state and postural kinematics executing a predictive machine learning model on the data stream to identify a latent intent for a waste elimination event broadcasting a predictive telemetry signal comprising a geographical coordinate, a probability threshold, and a projected temporal window for the waste elimination event;

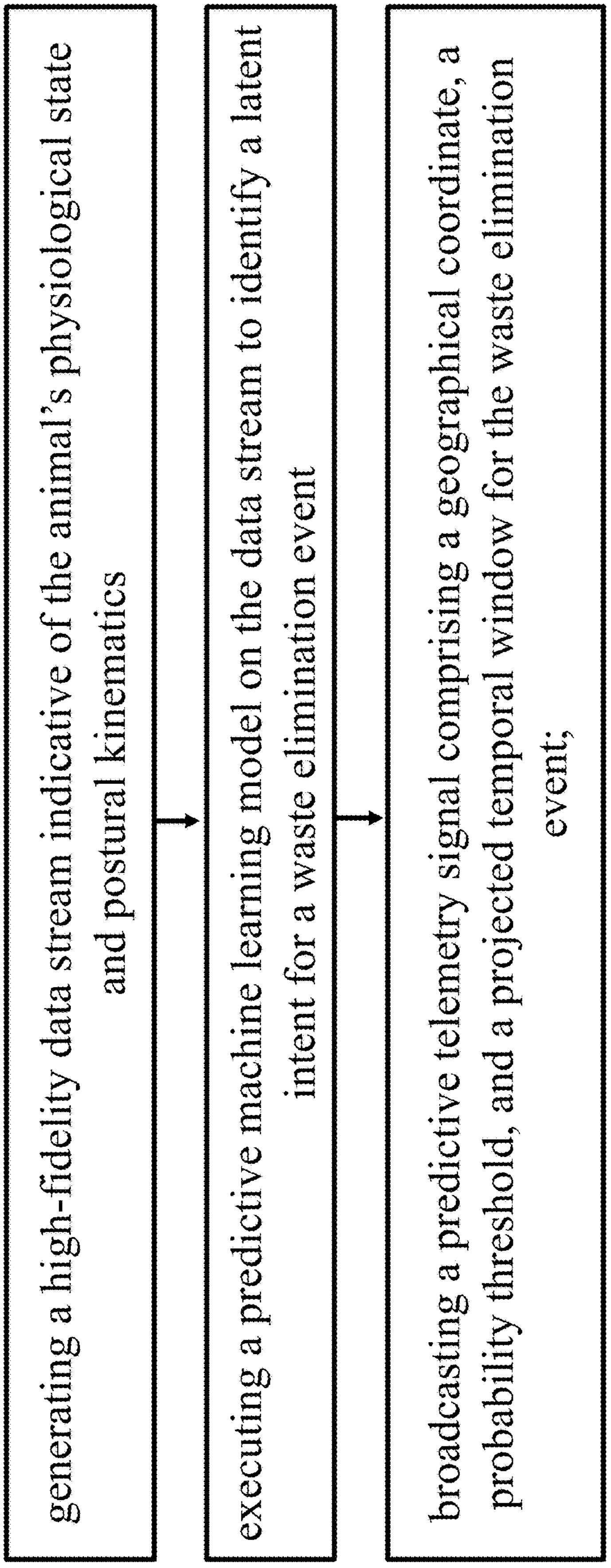

FIG. 5 autonomously navigating to the geographical coordinate based on the predictive telemetry signal

Figure 7:
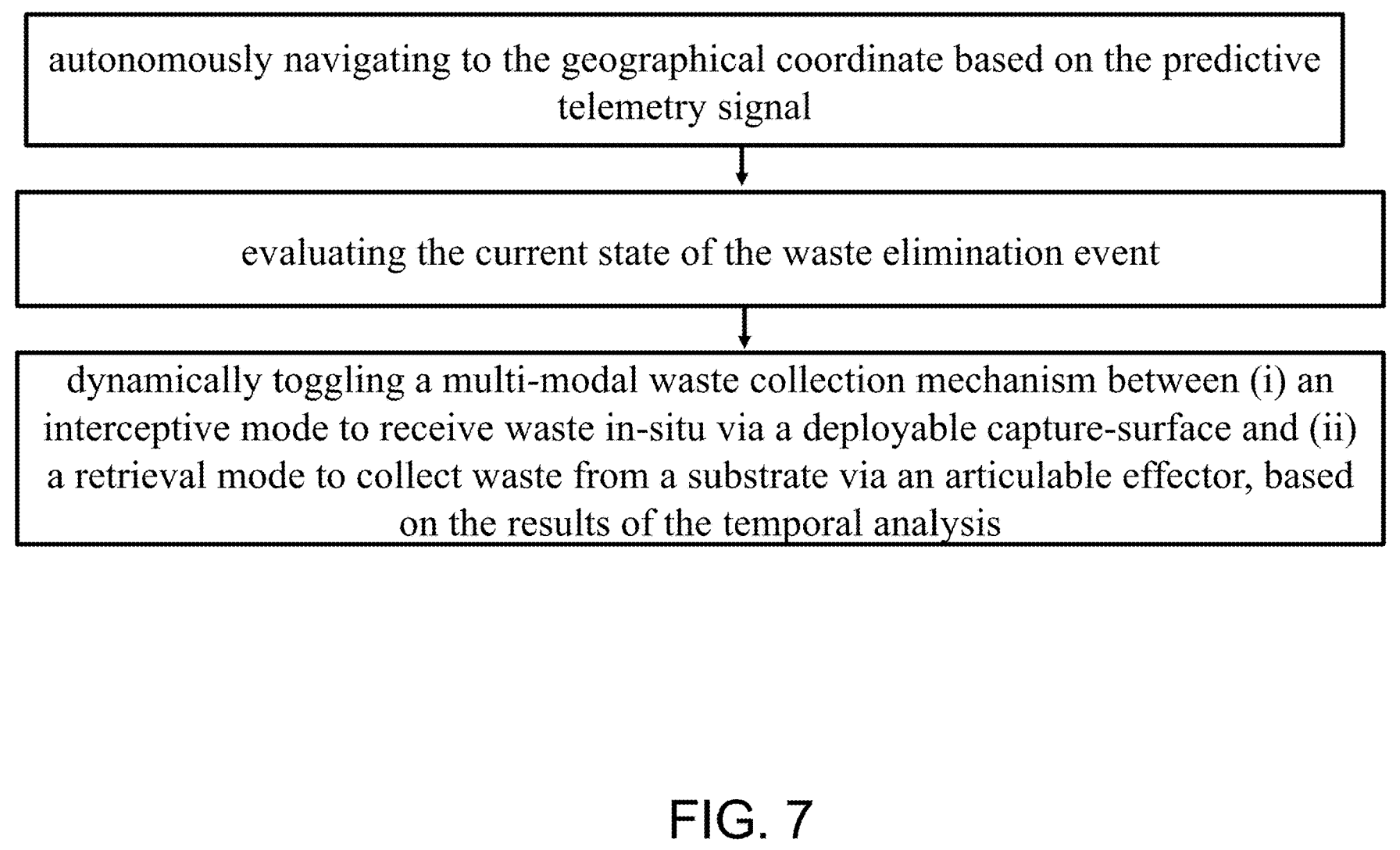

→ evaluating the current state of the waste elimination event

→ dynamically toggling a multi-modal waste collection mechanism between (i) an interceptive mode to receive waste in-situ via a deployable capture-surface and (ii) a retrieval mode to collect waste from a substrate via an articulable effector, based on the results of the temporal analysis

FIG. 7 executing an automated offloading sequence to receive and consolidate waste from the AAV into a centralized containment module

↓ initiating a charging cycle to manage the energy lifecycle of the AAV, thereby restoring the AAV to a kinetic-ready state for subsequent dispatch

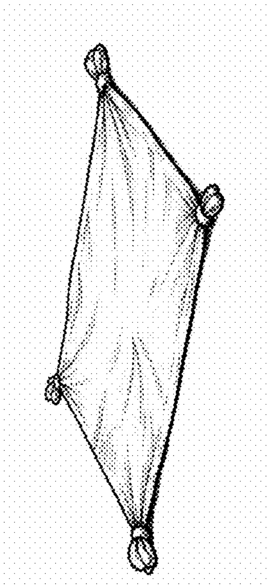
FIG. 22
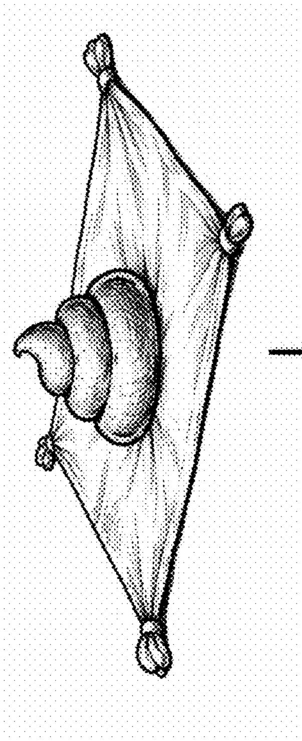
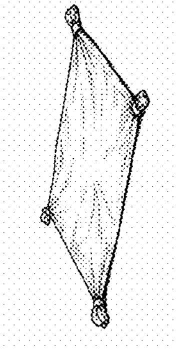
FIG. 23
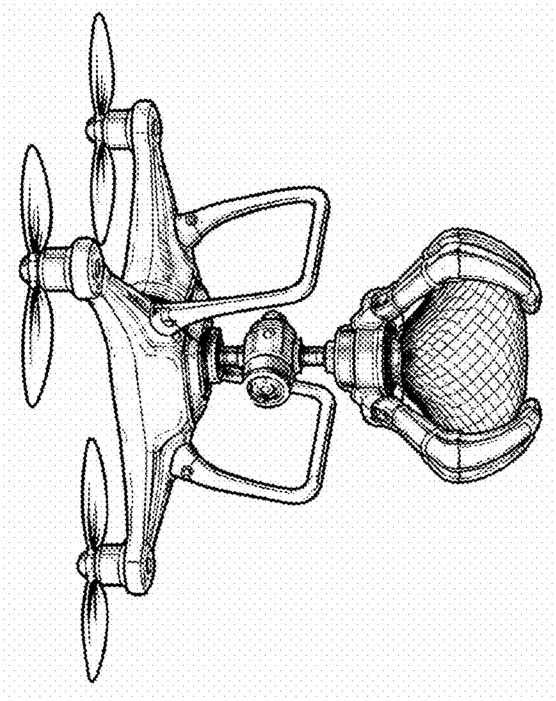
FIG. 24

AUTOMATED ANIMAL WASTE COLLECTION SYSTEM

FIELD OF THE INVENTION

The present invention pertains generally to the field of automated sanitation and robotics. More specifically, the invention relates to systems and methods for the automated detection and collection of animal waste.

DESCRIPTION OF THE RELATED ART

Conventional methods for managing animal waste are largely manual and suffer from significant limitations. The primary method relies on the animal's owner or caretaker to collect the waste using bags or other implements. This approach is often inconvenient, raises hygiene concerns, and is prone to human error or neglect. Consequently, animal waste is frequently left uncollected in public and private spaces such as parks, residential sidewalks, and hiking trails.

In addition, animals provide substantial therapeutic and emotional benefits to humans. However, many individuals who could greatly benefit from animal companionship may face physical challenges that make timely and proper waste collection difficult. This limitation can discourage them from owning or engaging with animals, despite the potential therapeutic value.

When uncollected, animal waste can have serious environmental and social consequences. It can act as a pollutant, contaminate water sources, and pose health risks to humans and other animals. Passive measures—such as the installation of public waste bins and bag dispensers—have been implemented to promote responsible waste collection but remain fundamentally inadequate. These solutions depend entirely on human diligence and do not effectively address situations involving physical limitations, inaccessibility, or simple neglect.

There exists, therefore, a clear and unmet need for an automated, proactive, and reliable system to manage animal waste. Such a system would alleviate the burden on animal owners, improve public sanitation, and reduce the environmental impact of animal waste across diverse settings, from dense urban areas to remote natural environments.

SUMMARY OF THE INVENTION

The present invention provides a comprehensive system and method for automated animal waste removal, addressing the limitations of conventional manual approaches. The system is designed to operate with minimal human intervention, ensuring timely, hygienic, and efficient cleanup. In doing so, the invention offers a sustainable, health-conscious, and user-friendly solution that benefits both individual users and the broader community.

A primary objective of the present invention is to enable elderly individuals and persons with physical limitations to enjoy the companionship and therapeutic benefits of animals—such as dogs—without the burden or difficulty of manual waste collection. By automating or facilitating the waste management process, the invention promotes accessibility and inclusivity in animal ownership and animal-assisted therapy.

Another objective of the present invention is to improve environmental hygiene and public sanitation by ensuring prompt and effective collection of animal waste. The invention further seeks to reduce pollution, prevent contamination of water sources, and enhance the cleanliness and safety of shared environments such as parks, sidewalks, and recreational areas.

On a first aspect of the present invention, a system for automated animal waste collection is disclosed. The system comprises a wearable monitoring assembly and an autonomous aerial vehicle. Said wearable monitoring assembly is configured to be comfortably fitted to an animal. It continuously monitors the animal's physiological and postural data, using an onboard processor and a machine learning model to accurately predict an imminent waste elimination event. Upon positive identification, it generates and transmits a predictive alert signal that includes the animal's precise geographical location.

Said autonomous aerial vehicle, upon receiving the alert signal, is autonomously dispatched to the animal's location. The autonomous aerial vehicle is equipped with a propulsion system for navigation and a specialized waste collection mechanism.

Further, autonomous aerial vehicle is equipped with a dual-mode waste collection mechanism. This mechanism can be configured in an interceptive mode to prepare the surface and capture the waste as it is being eliminated, thereby preventing ground contamination. Alternatively, it can be configured in a retrieval mode to collect waste after it has been deposited on a substrate. This dual functionality ensures effective waste removal regardless of the vehicle's arrival time relative to the elimination event.

On a second aspect of the present invention, a system for automated animal waste collection is disclosed. The method comprises the steps of collecting, via a wearable assembly, location data and physiological data of an animal;

- analyzing the physiological data with a machine learning classification algorithm to distinguish a pre-elimination posture;
- upon identifying a high-probability waste elimination event, generating and transmitting a predictive alert signal comprising the geographical location of the animal and estimated target time of arrival;
- in response to the predictive alert signal, autonomously navigating an aerial vehicle to the geographical location;
- comparing a timing of arrival of the aerial vehicle relative to a waste elimination process;
- upon the arrival occurs during the waste elimination process, configuring a collection mechanism in an interceptive mode to directly receive discharged waste;
- upon the arrival occurs after the waste elimination process, configuring the collection mechanism in a retrieval mode to collect the waste deposited on a substrate; and
- storing the collected waste in a containment unit for subsequent disposal.

The invention thus offers significant advantages over the prior art, including proactive and timely waste collection, elimination of the need for direct human intervention, and a marked improvement in hygiene and cleanliness in public, private, and remote areas.

On a third aspect of the present invention, the invention describes a distributed infrastructure system for predictive and automated animal waste management, communicating to smart city network. The distributed infrastructure system comprises a a wearable monitoring assembly, an autonomous infrastructure hub, and plurality of autonomous aerial vehicles (AAVs).

The wearable monitoring assembly is configured to be coupled to an animal and the comprising a sensor assembly and an edge-computing processor. The edge-computing processor is configured to: generate a high-fidelity data stream indicative of the animal's physiological state and postural kinematics; execute a predictive machine learning model on the data stream to identify a latent intent for a waste elimination event; and broadcast a predictive telemetry signal comprising a geographical coordinate, a probability threshold, and a projected temporal window for the event.

The autonomous infrastructure hub comprises a docking array and a centralized orchestration controller. The autonomous infrastructure hub is configured to: maintain a plurality of autonomous aerial vehicles (AAVs) in a kinetic-ready state within the docking array; monitor energy-state metadata and spatial proximity for each of the plurality of AAVs; and perform dynamic resource allocation by dispatching at least one selected AAV from the docking array in response to the predictive telemetry signal, wherein the dispatch is optimized based on a spatial-temporal conflict resolution algorithm to ensure non-overlapping flight trajectories.

The plurality of autonomous aerial vehicles (AAVs), each comprises a variable-configuration propulsion system; a multi-modal waste collection mechanism configurable between (i) an interceptive mode utilizing a deployable capture-surface to receive waste in-situ during elimination; and (ii) a retrieval mode utilizing an articulable effector to collect waste from a substrate post-deposition; and a vehicle control unit configured to autonomously navigate to the geographical coordinate and dynamically toggle the collection mechanism between the interceptive mode and the retrieval mode based on a real-time comparison between the AAV's time-of-arrival and the state of the waste elimination event. Wherein the autonomous infrastructure hub further comprises an automated offloading module configured to receive and consolidate waste from the plurality of AAVs and a charging subsystem configured to manage the energy lifecycle of the plurality of AAVs to ensure continuous operational availability.

On a fourth aspect of the present invention, the invention describes a method predictive and automated animal waste management within a distributed infrastructure environment, the method comprising: at a wearable monitoring assembly coupled to an animal: generating a high-fidelity data stream indicative of the animal's physiological state and postural kinematics; executing a predictive machine learning model on the data stream to identify a latent intent for a waste elimination event; and broadcasting a predictive telemetry signal comprising a geographical coordinate, a probability threshold, and a projected temporal window for the waste elimination event; at an autonomous infrastructure hub managing a plurality of autonomous aerial vehicles (AAVs): maintaining the plurality of AAVs in a kinetic-ready state within a docking array; monitoring energy-state metadata and spatial proximity for each of the plurality of AAVs; and performing dynamic resource allocation by dispatching at least one selected AAV from the docking array in response to the predictive telemetry signal, wherein the dispatching is optimized via a spatial-temporal conflict resolution algorithm to ensure non-overlapping flight trajectories; via the dispatched autonomous aerial vehicle (AAV): autonomously navigating to the geographical coordinate based on the predictive telemetry signal; evaluating the current state of the waste elimination event; and dynamically toggling a multi-modal waste collection mechanism between (i) an interceptive mode to receive waste in-situ via a deployable capture-surface and (ii) a retrieval mode to collect waste from a substrate via an articulable effector, based on the results of the temporal analysis; and at the autonomous infrastructure hub, post-collection: executing an automated offloading sequence to receive and consolidate waste from the AAV into a centralized containment module; and initiating a charging cycle to manage the energy lifecycle of the AAV, thereby restoring the AAV to a kinetic-ready state for subsequent dispatch.

DESCRIPTION OF THE FIGURES

FIG. 5 is a schematic illustration of method step operated at a wearable monitoring assembly coupled to an animal:

FIG. 7 is a schematic illustration of method step operated at the dispatched autonomous aerial vehicle.

FIG. 22-24 illustrate one example of animal waste has not been eliminated when AAV arrives, a surface cover is placed on the ground for the animal to eliminate waste and it is packaged then picked up by the AAV

DETAILED DESCRIPTION OF THE PREFERRED EMBODIMENTS

Figure 1:
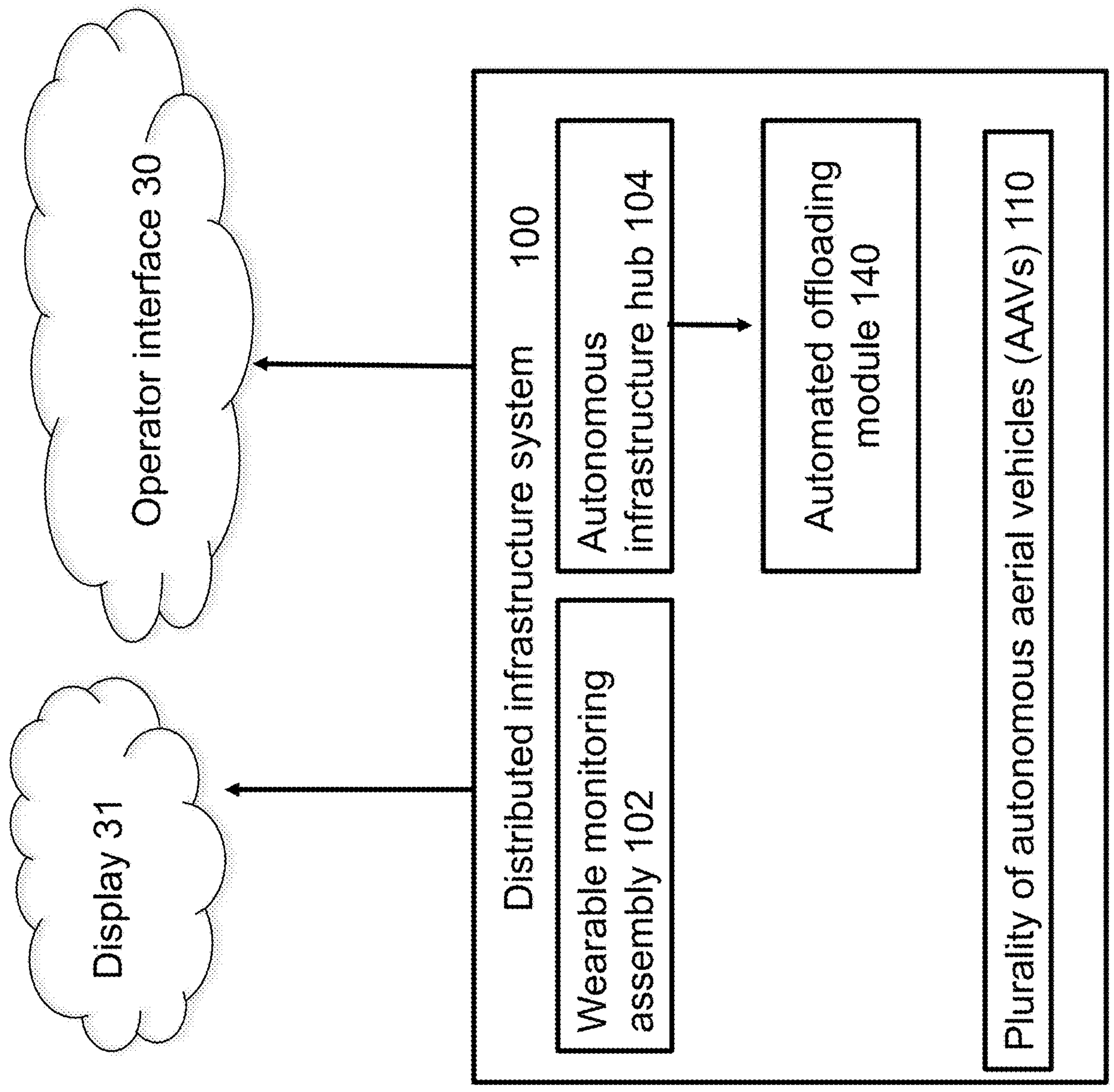
FIG. 1 is a schematic illustration of a distributed infrastructure system in accordance with the aspect of the present invention.
Figure 2:
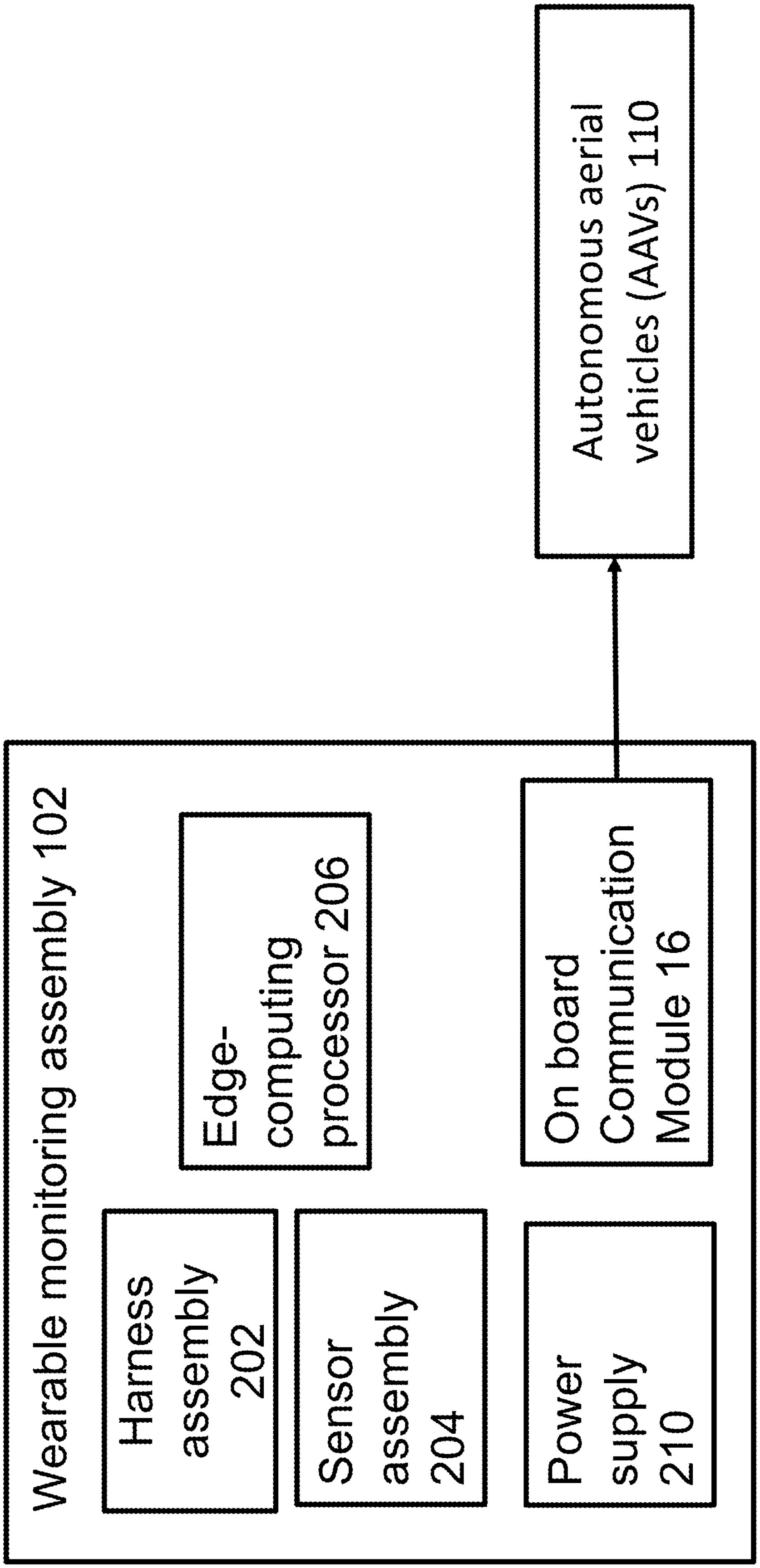
FIG. 2 is a schematic illustration of a wearable monitoring assembly in accordance with the aspect of the present invention.
Figure 3:
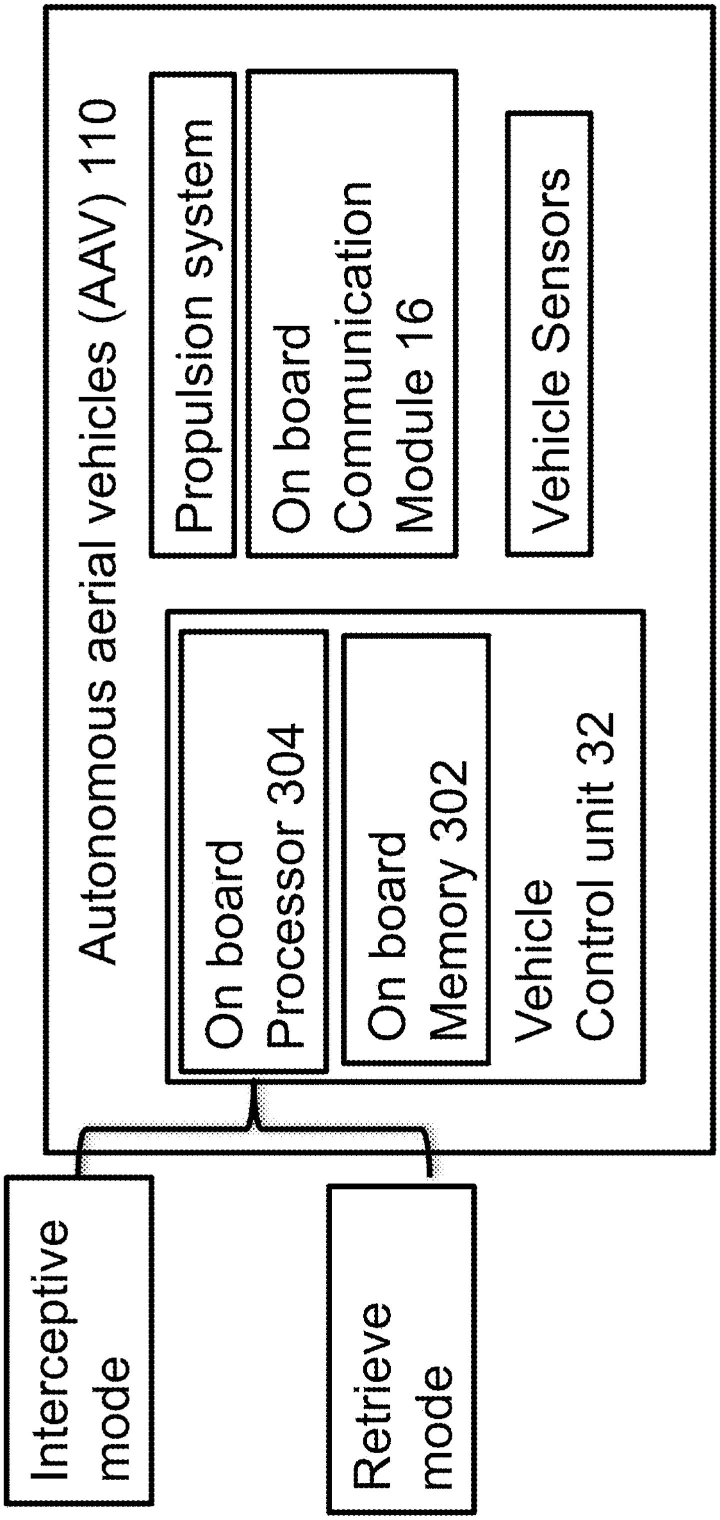
FIG. 3 is a schematic illustration of an autonomous aerial vehicles (AAV) in accordance with the aspect of the present invention.
Figure 4:
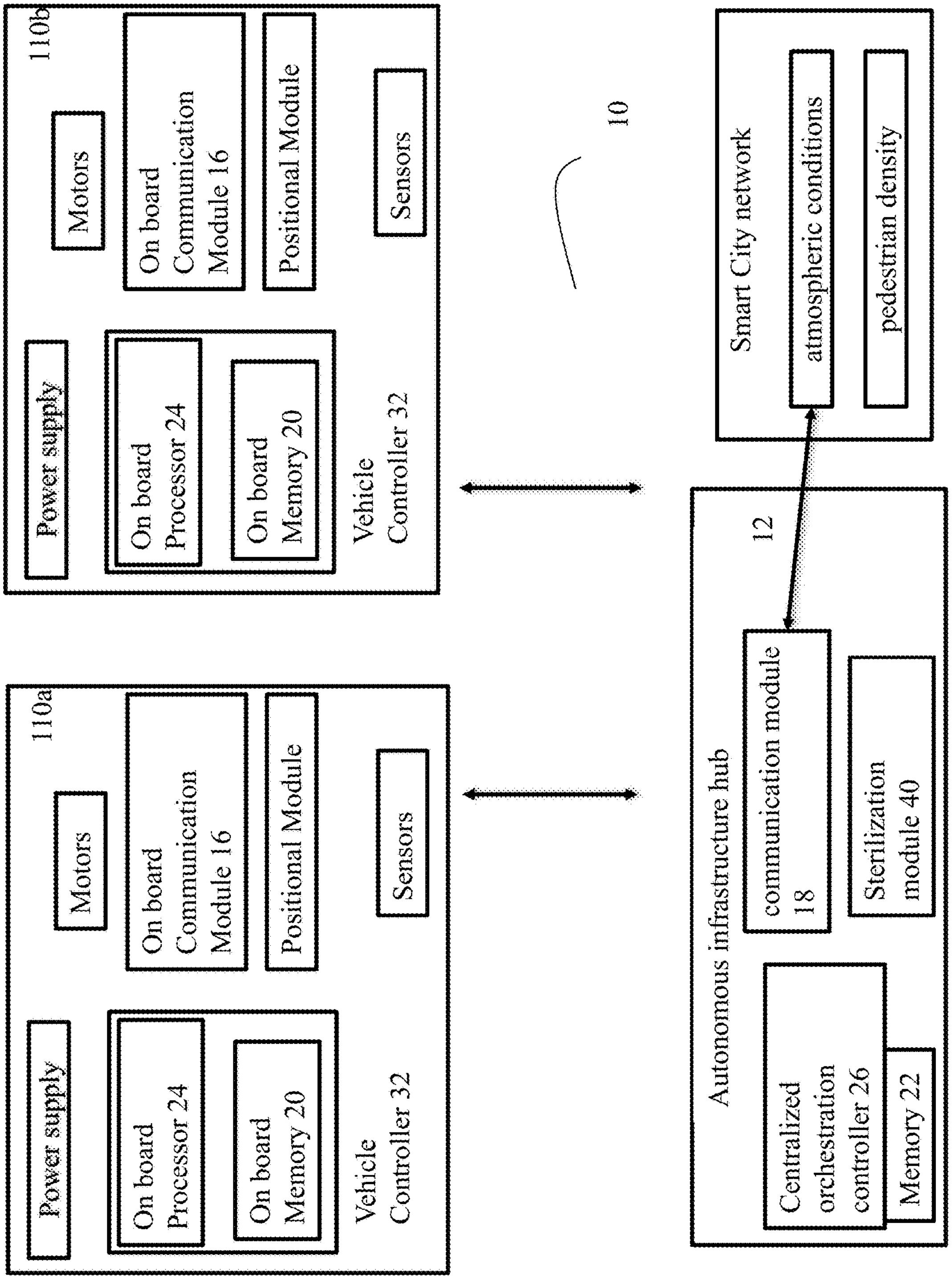
FIG. 4 is a schematic illustration of an embodiment of the distributed infrastructure system in accordance with the aspect of the present invention Autonomous aerial vehicles (AAV)
Figure 6:
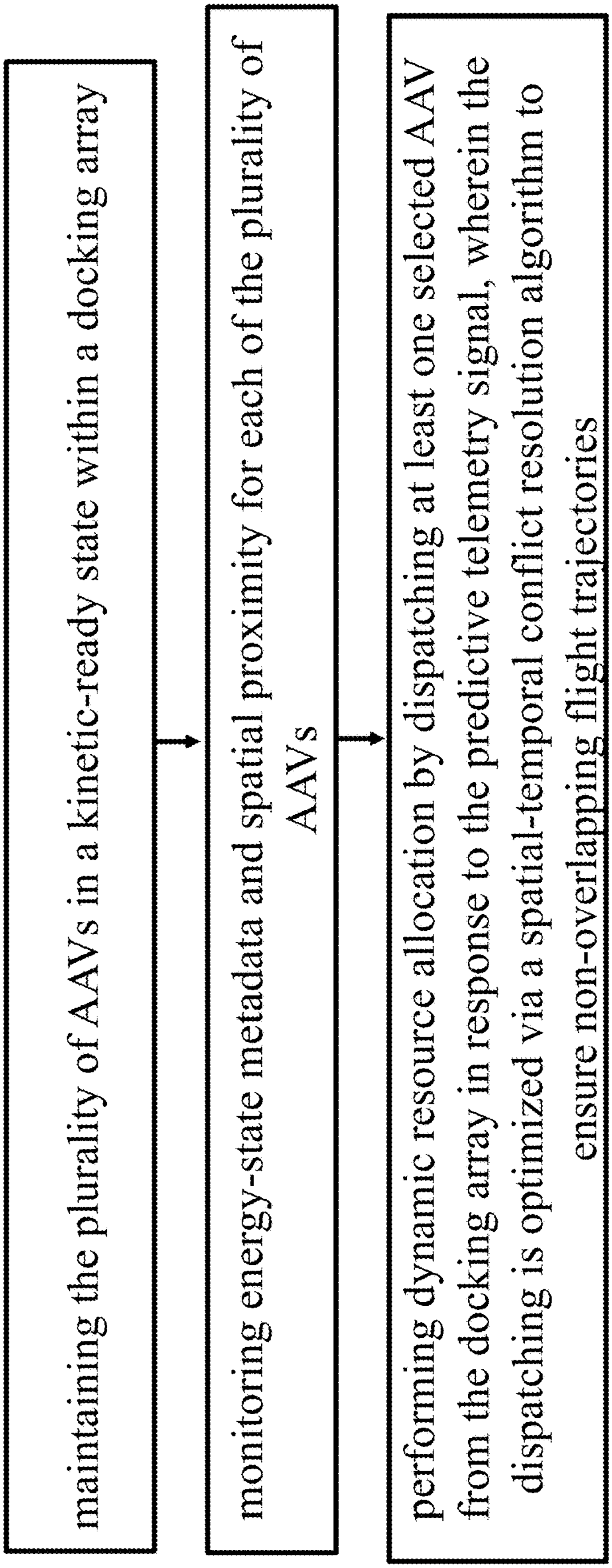
FIG. 6 is a schematic illustration of method step operated at an autonomous infrastructure hub managing a plurality of autonomous aerial vehicles
Figure 8:
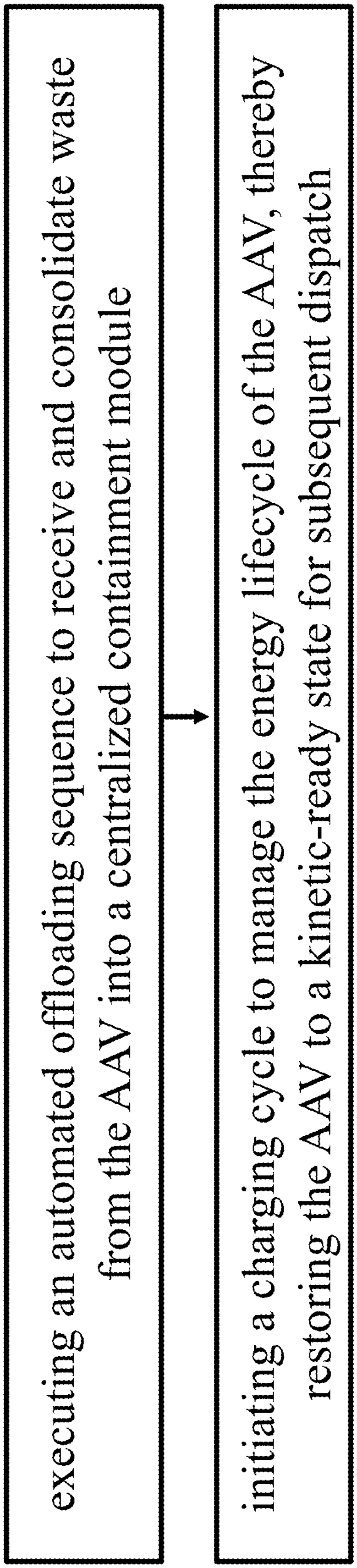
FIG. 8 is a schematic illustration of method step operated at the autonomous infrastructure hub during post-collection.
Figure 9:
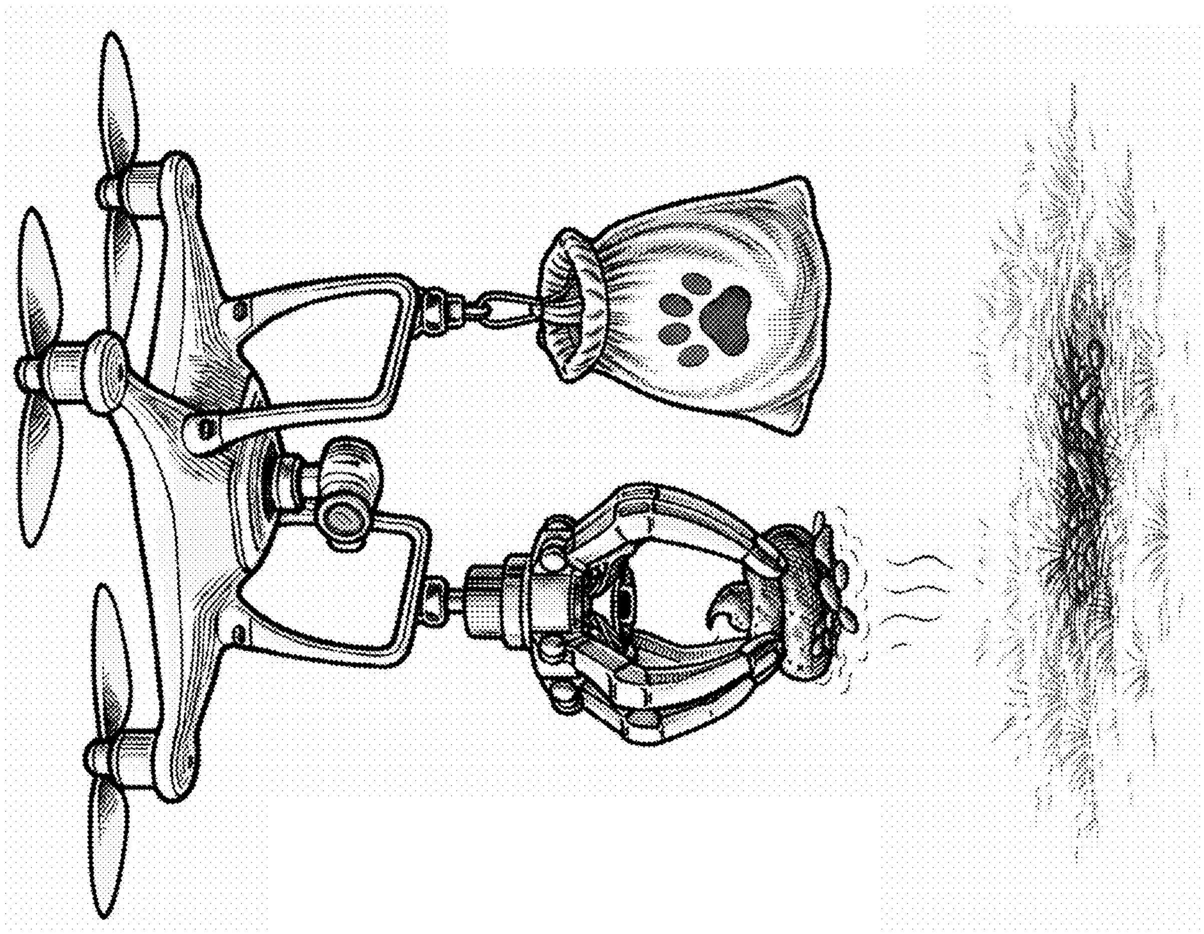
FIG. 9 is a schematic illustration of one embodiment, in retrieval mode, of the present invention.
Figure 11:
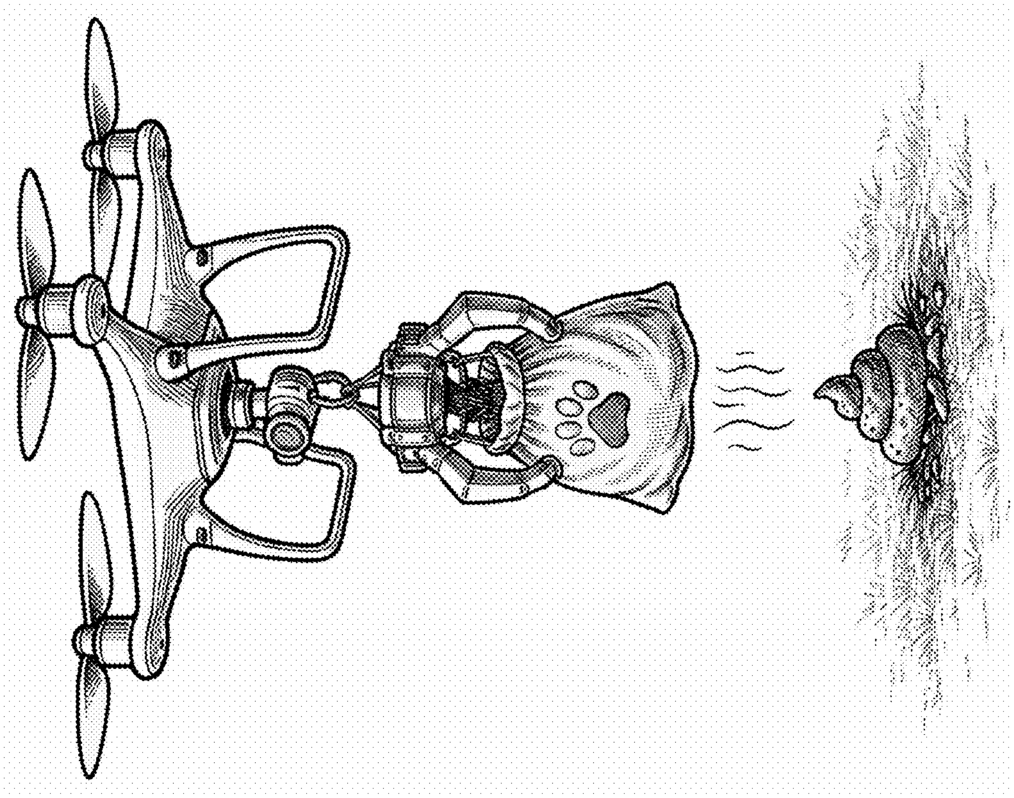
FIG. 10-11 are schematic illustrations of alternative embodiments of the present invention, wherein the claw is inside the waste bag or the claw is outside of the waste bag.
Figure 10:
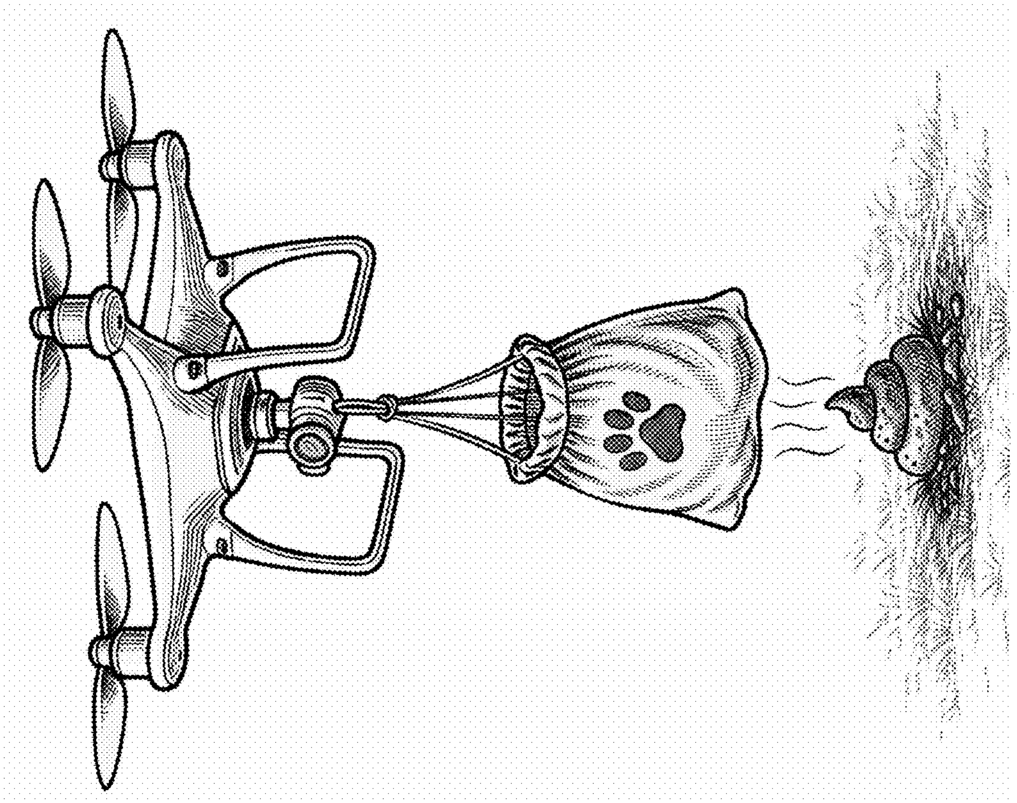
Figure 13:
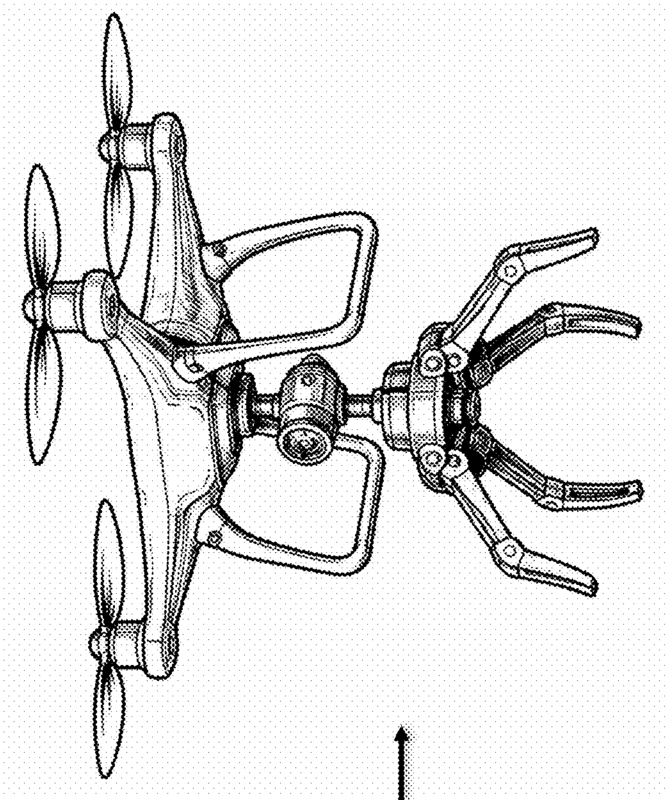
FIG. 12-15 illustrate the steps that a AAV is flying to the animal location, opening up the claws picking up the animal waste and discharging the animal waste into a waste container.
Figure 12:
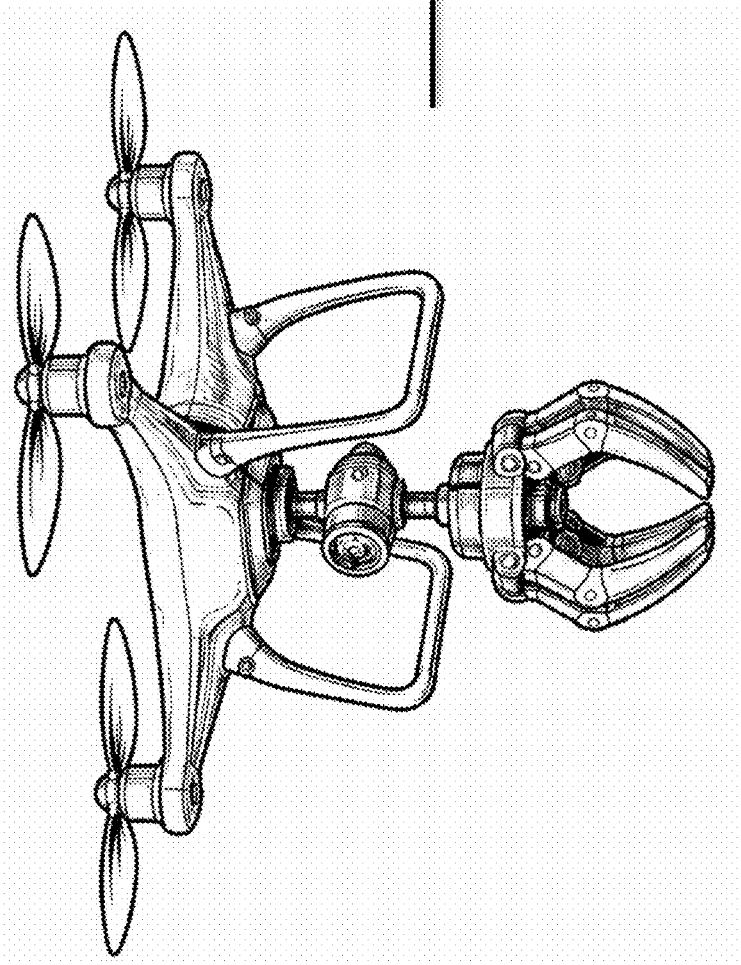
Figure 14:
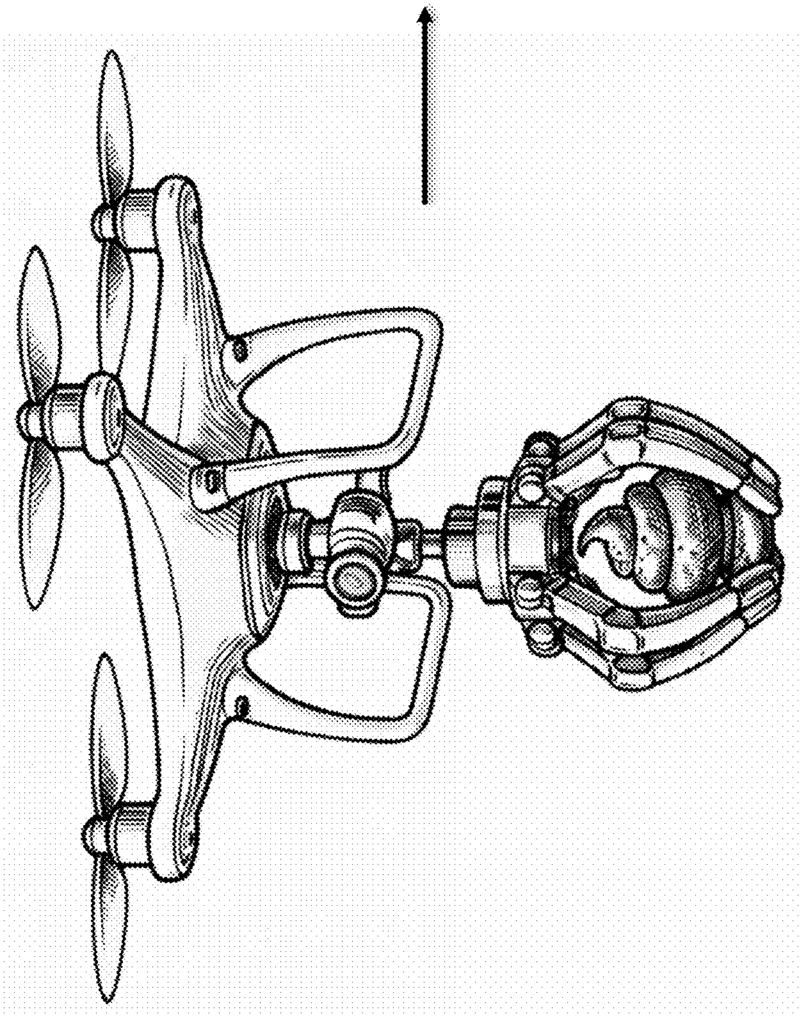
Figure 15:
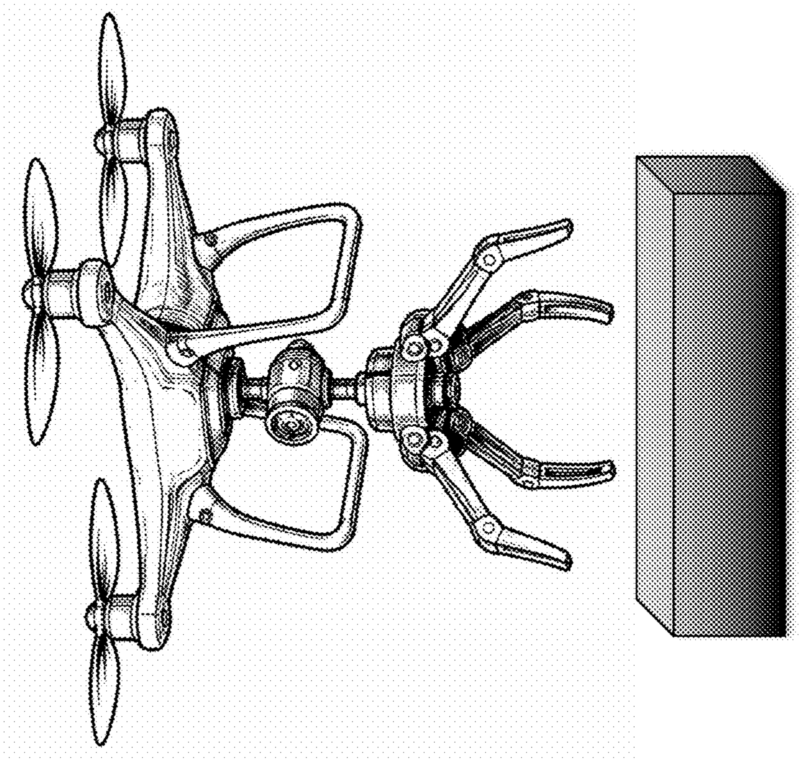
Figure 17:
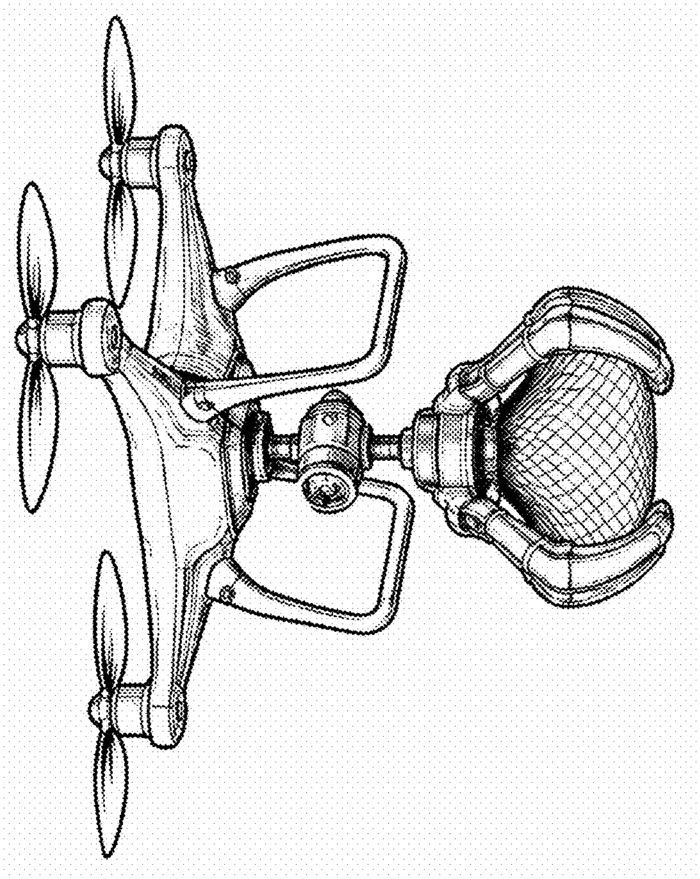
FIG. 16-17 illustrate alternative implementations of the present invention, wherein the claws of the AAV have extended areas integrated on the claws or attached inside of the claws configured to cover up the animal waste.
Figure 16:
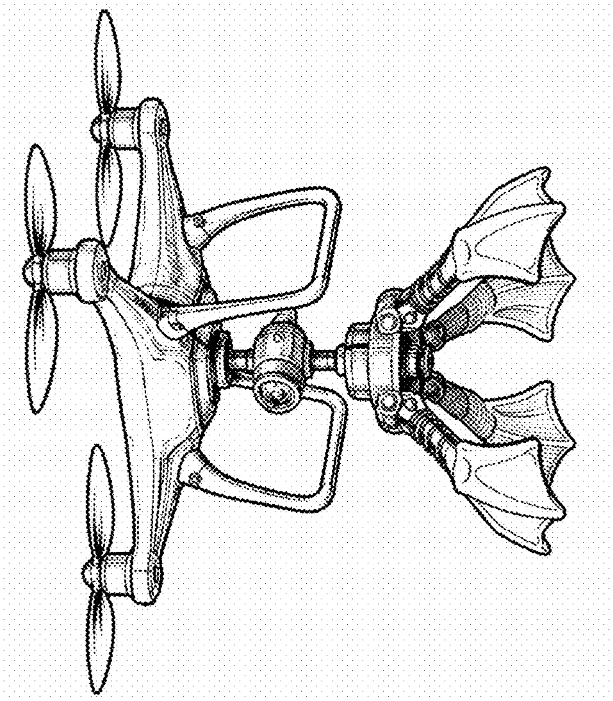
Figure 19:
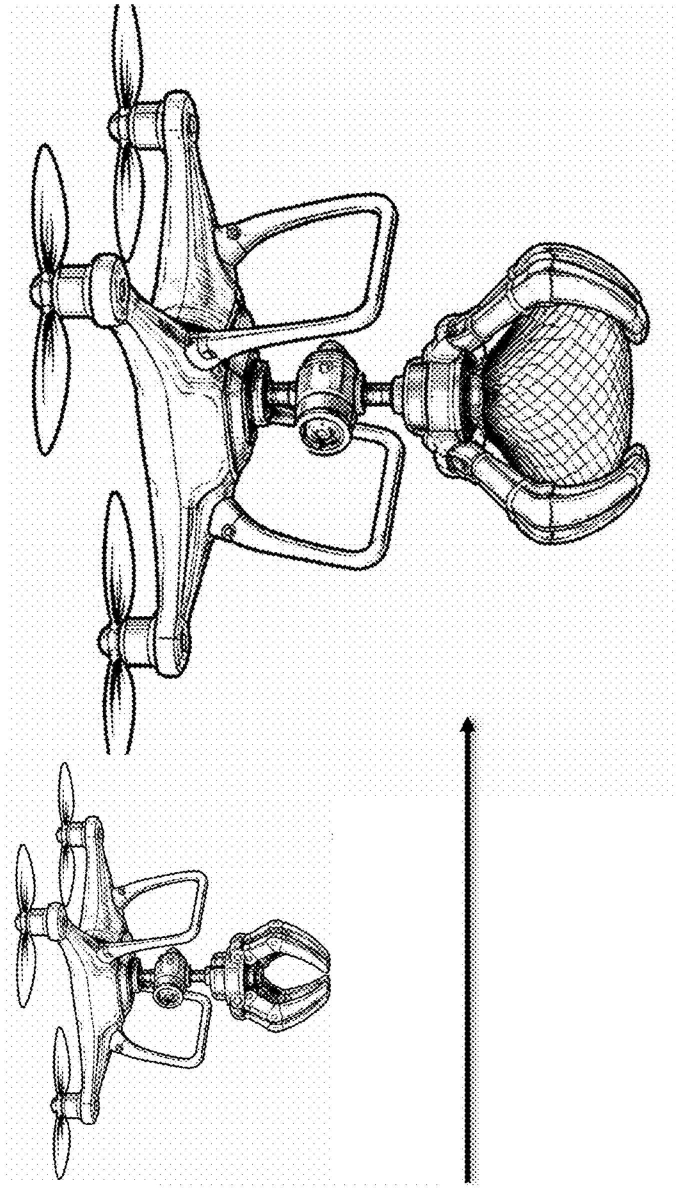
FIG. 18-19 illustrate one example of animal waste has been eliminated when AAV arrives, a waste bag is used to cover up the animal waste and a AAV having claws picks up the covered animal waste.
Figure 18:
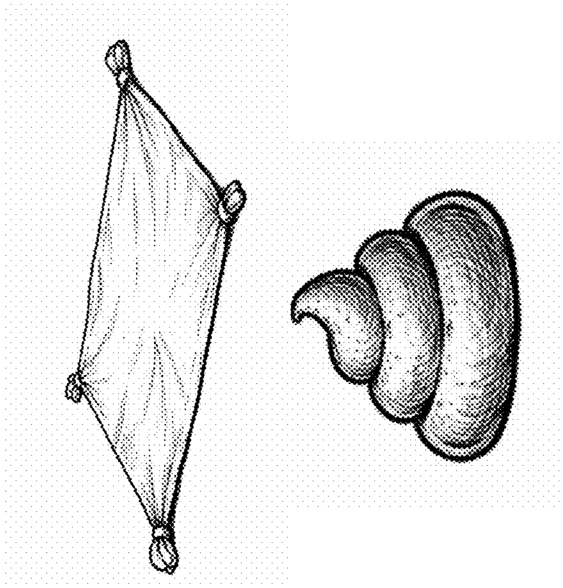
Figure 21:
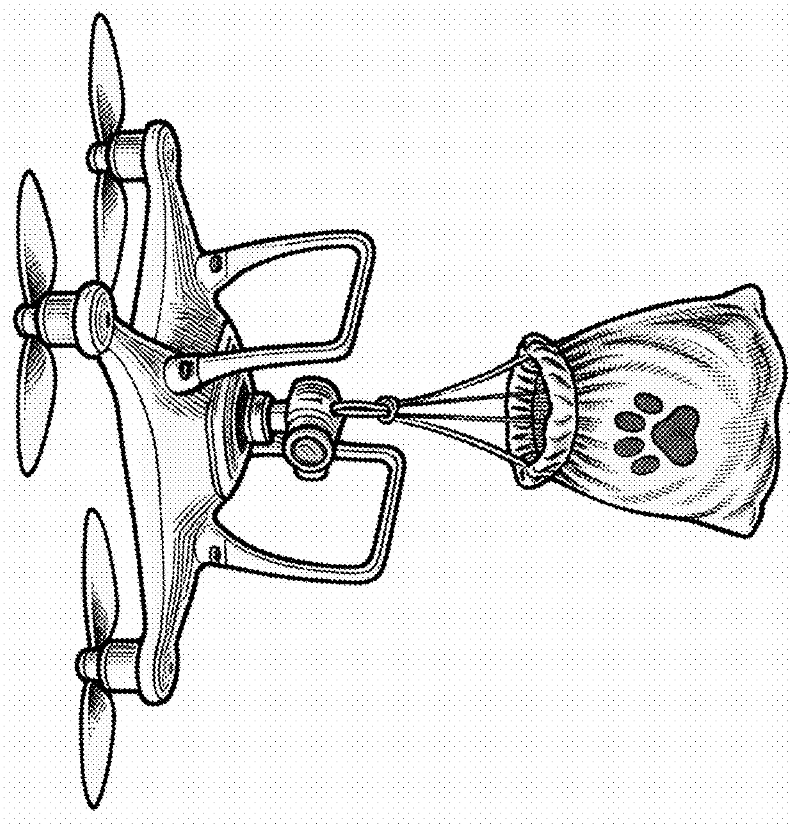
FIG. 20-21 illustrate one example of animal waste has not been eliminated when AAV arrives, the claws of the AAV will receive the animal waste before it reaches to the ground either through its extended claws or a waste bag.
Figure 20:
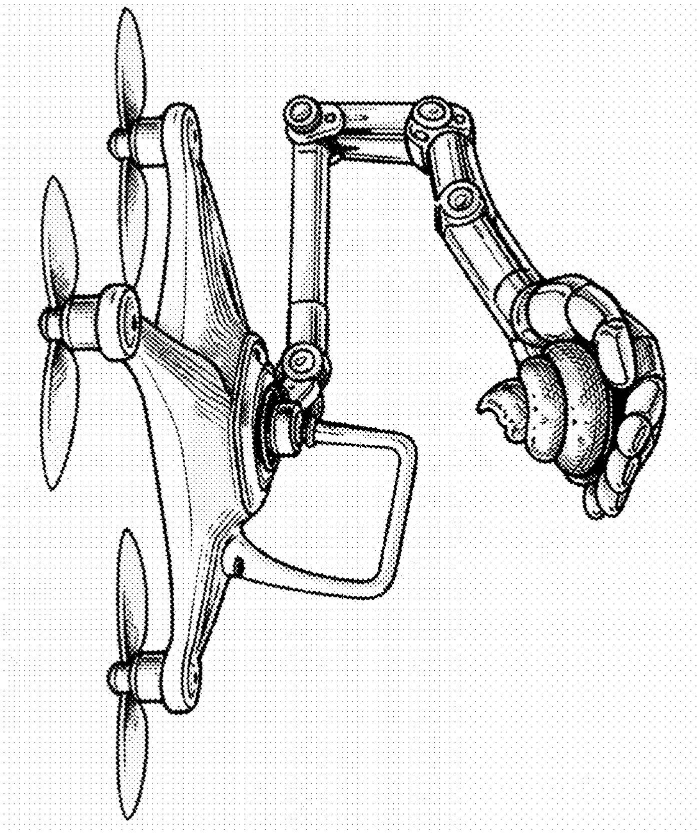

The following detailed description illustrates the structure, function, and operation of the invention's preferred embodiments. This description is intended to provide a comprehensive understanding of the invention but is not to be considered limiting in its scope.

System Overview

In accordance with the aspect of the inventions, the first aspect is directed to a system for automated animal waste collection.

The Automated Animal Waste Collection System is an integrated solution comprising two primary components that operate in a synergistic fashion: a wearable monitoring assembly and an autonomous aerial vehicle (AAV). The wearable monitoring assembly functions as the detection and alert subsystem, responsible for predicting a waste elimination event and communicating its imminence. The AAV functions as the navigation and collection subsystem, responsible for physically traveling to the site and removing the waste.

The operation of the system is based on the generation and transmission of a predictive alert signal by the wearable monitoring assembly to the autonomous aerial vehicle. The predictive alert signal serves as a triggering event that initiates the automated waste collection sequence. Upon receipt of the signal, the autonomous aerial vehicle is configured to navigate to the identified location and to perform a corresponding collection operation. The communication of the predictive alert signal thereby enables a coordinated and timely response between the wearable monitoring assembly and the aerial vehicle, ensuring efficient detection and removal of animal waste with minimal human intervention.

Wearable Monitoring Assembly

In one embodiment, the wearable monitoring assembly functions as the predictive front-end of the automated animal waste collection system. The assembly is configured to identify waste elimination events immediately preceding or concurrent with the onset of such events. The wearable monitoring assembly is designed to be lightweight, ergonomically adaptable, and non-intrusive to the animal, thereby permitting continuous monitoring without interfering with normal movement or behavior.

In various embodiments, the wearable monitoring assembly comprises a harness assembly, a sensor assembly, and a processor executing a predictive model, an alert generation and communication module.

Harness Assembly

In one embodiment, the harness assembly comprises at least one adjustable strap configured to accommodate animals of varying sizes and to ensure a secure and comfortable fit. The harness assembly further houses a power source, which is preferably a rechargeable battery configured to supply power to the processor, communication module, and sensor elements. In certain embodiments, the harness assembly optionally comprises a pulling member, upon which one or more sensors may be disposed for optimized data acquisition and improved signal fidelity. The harness assembly may animal ID, which may be associated with one of the processor, positional sensors or biological sensor.

Pulling Member Sensor Integration

In certain embodiments, the wearable monitoring assembly further comprises a pulling member, such as a leash, harness lead, tether, retractable cord, or similar elongated coupling element configured to extend between the animal and a caretaker or anchor point.

In one embodiment, the biological activity sensor suite is disposed on, embedded within, or integrated along a segment of the pulling member. The pulling member may comprise an internal core structure and an outer protective sheath, wherein one or more sensors are embedded within the core structure to measure dynamic mechanical forces transmitted through the pulling member.

In some embodiments, the pulling member has one of the members selected from: one or more strain gauges configured to measure tensile force; a piezoelectric element configured to detect oscillatory frequency signatures; a fiber-optic strain sensor configured for high-resolution deformation detection; a micro-electromechanical system (MEMS)-based force sensor; and/or a tension transducer positioned proximate to a handle portion of the pulling member.

The sensors may be distributed along a defined sensing segment of the pulling member, such as a distal region proximate the animal, a proximal region proximate a handle, or an intermediate region configured to capture force harmonics.

Biomechanical Signature Detection

In operation, the pulling member sensors are configured to capture biomechanical tension and frequency data indicative of pre-elimination behavior. Such behavior may include: repetitive circling motions; abrupt directional pauses; backward stepping; increased leash tension oscillation frequency; characteristic strain-release cycles associated with postural positioning The edge-computing processor may execute a signal-processing pipeline that extracts one or more of: oscillatory frequency spectra, strain-rate differentials, temporal periodicity patterns. These biomechanical signatures may be fused with IMU data, thermal data, VOC detection, and positional data to increase predictive confidence of a latent elimination intent.

In certain embodiments, the pulling member sensor data provides a predictive lead time enhancement relative to body-mounted sensors alone by detecting force transmission prior to full postural commitment.

Structural Variations

In some embodiments, the pulling member is detachable and modular, enabling replacement or upgrade of the sensor segment without replacing the entire wearable monitoring assembly.

In other embodiments, the pulling member comprises a multi-conductor internal channel configured to transmit both sensor data and power between the animal-mounted assembly and a handle-based processing module.

In yet another embodiment, the pulling member includes an onboard microcontroller configured to perform localized signal conditioning before transmitting processed data to the edge-computing processor.

Sensor Assembly

In one embodiment, the sensor assembly is configured to collect raw data indicative of both the animal's location and biological state. The sensor assembly may comprise one or more positional sensors and one or more biological activity sensors.

The positional sensor may include, by way of example, a Global Positioning System (GPS) unit, an Inertial Measurement Unit (IMU), or a combination thereof, configured to generate data indicative of the animal's geographical position and motion trajectory.

The biological activity sensor may include, without limitation, one or more of: an inertial measurement unit (IMU), a motion sensor, a temperature sensor, a gas sensor configured to detect volatile organic compounds (VOCs), or an imaging device. These sensors generate physiological or postural data indicative of a pre-elimination condition or behavioral pattern associated with waste elimination.

Processor and Predictive Model

In one embodiment, the processor is operatively coupled to the sensor assembly and is configured to execute a machine learning classification algorithm trained on datasets comprising postural and biological signals. The predictive model is adapted to distinguish a pre-elimination posture from non-elimination activities, such as sitting, lying down, or walking.

To improve accuracy and responsiveness, the processor may be further configured with historical behavioral data, daily routine or customized training datasets specific to the monitored animal. This adaptive training enhances the precision of the predictive model across varying environmental and behavioral contexts.

Alert Generation and Communication Module

Upon identification of a high-probability waste elimination event—such as when a confidence threshold of at least 80% is exceeded—the processor generates a predictive alert signal. The predictive alert signal includes, for example, the animal's current geographical coordinates and an estimated target time of arrival for the external collection system, such as five seconds prior to the expected onset of elimination.

A first communication module, operatively coupled to the processor, is configured to transmit the predictive alert signal to the autonomous aerial vehicle (AAV). Transmission of the predictive alert signal initiates the automated waste collection sequence.

Notification Element

In certain embodiments, optionally but preferably, the wearable monitoring assembly further comprises a notification element configured to provide a confirmation cue to the animal's caretaker, indicating that the external waste collection system has been successfully summoned and is en route to the designated location.

The predictive functionality of the wearable monitoring assembly is essential to enabling the proactive response of the autonomous aerial vehicle. By accurately forecasting imminent waste elimination events, the assembly facilitates timely navigation and deployment of the collection mechanism, thereby ensuring hygienic and efficient waste removal with minimal human intervention.

Autonomous Aerial Vehicle (AAV)

In one embodiment, the autonomous aerial vehicle (AAV) functions as the mobile and collection subsystem of the automated animal waste collection system. The AAV is responsible for autonomously navigating to the location identified in the predictive alert signal and for physically collecting and containing the animal waste. The AAV is engineered for reliable operation in a range of environmental conditions and is configured to function with minimal or no human intervention.

Autonomous Aerial Vehicle (AAV)

In various embodiments, the autonomous aerial vehicle (AAV) functions as the mobile and collection subsystem of the automated animal waste collection system. The AAV is configured to autonomously navigate to the geographical location identified in the predictive alert signal generated by the wearable monitoring assembly and to perform waste collection in accordance with the timing of the elimination event. The AAV operates in communication with the wearable monitoring assembly and is engineered for autonomous operation, stability, and robust performance across a variety of terrains and environmental conditions.

In certain embodiments, the AAV comprises a vehicle structure and propulsion system, a communication and control system, a dual-mode collection mechanism, and a waste containment and disposal unit.

Vehicle Structure and Propulsion

In one embodiment, the propulsion system of the AAV is configured to support vertical takeoff and landing (VTOL), as well as hovering, forward flight, and precise landing operations. This configuration enables the AAV to operate effectively in complex or confined environments such as residential areas, public parks, or uneven terrain. The propulsion system may include multiple lift rotors or ducted fans powered by one or more electric motors supplied by an onboard energy source, such as a rechargeable battery pack.

In certain embodiments, the AAV further comprises a miniature imaging device or camera configured to provide visual feedback during navigation or collection. The imaging device may facilitate terrain assessment, object recognition, or verification of waste collection, particularly under low-light or variable-visibility conditions.

Communication and Control System

In one embodiment, the AAV includes a second communication module configured to receive the predictive alert signal transmitted from the wearable monitoring assembly. The predictive alert signal comprises at least the geographical coordinates of the animal and an estimated target time of arrival of the AAV.

In one embodiment, the autonomous aerial vehicle (AAV) is implemented as a single AAV unit. The AAV comprises a second communication module that is operatively coupled to a vehicle control unit. The vehicle control unit may be physically positioned on, or integrated within, the AAV itself. The vehicle control unit is configured to coordinate and control the AAV's propulsion system, navigation algorithms, and dual-mode collection mechanism. Upon receipt of the predictive alert signal, the vehicle control unit autonomously initiates and manages navigation of the individual AAV to the specified geographical location corresponding to the position of the animal. During flight, the control unit continuously adjusts propulsion and flight parameters based on positional feedback and environmental inputs to ensure accurate arrival at the target site within the estimated target time of arrival window.

In another embodiment, the AAV comprises a coordinated group or fleet of AAVs operating in communication with one another and/or with a centralized or distributed control infrastructure. In one example, the centralized and then distributed control infrastructure is a docketing station in a dog park. Each AAV within the group comprises its own propulsion system, vehicle control unit, and collection mechanism, while being linked via communication network to the docketing station that enables cooperative task allocation and flight coordination. Then the predictive alert signal is sent to the docketing station. The docketing will assign corresponding response tasks to individual AAVs.

In such embodiments, the system may automatically select an optimal subset of AAVs based on proximity to the event location, available battery capacity, containment status, and flight path conditions. Once assigned, the selected AAVs operate collaboratively to execute navigation and waste collection tasks. For example, one AAV may perform a primary collection or interceptive function, while one or more auxiliary AAVs provide secondary functions such as illumination, environmental sensing, or redundant data verification to avoid collision.

In certain embodiments, the operational correspondence between the animal and the autonomous aerial vehicle (AAV) may be implemented in different configurations depending on the deployment environment. In a residential or localized setting, a one-to-one correspondence may be established between an individual animal and a dedicated AAV. In such an arrangement, the AAV—typically a compact AAV—is paired exclusively with a single animal through its wearable monitoring assembly. The paired AAV may be stationed within or near the animal's home environment, such as in a private yard, garage, or immediate vicinity, thereby enabling rapid response and localized operation without reliance on external infrastructure. This configuration is particularly suitable for domestic use, where the predictable movement range of the animal allows efficient single-AAV operation and direct charging from a home docking platform.

In other embodiments, a multi-AAV correspondence configuration may be employed, wherein multiple AAVs are coordinated through a centralized docking station or control node. This arrangement is particularly suited for shared or public environments, such as community centers, sensor-equipped service hubs, dog parks, or managed open spaces. In such installations, the docking station serves as a local command center that receives predictive alert signals from multiple animals' wearable assemblies, prioritizes the events based on timing and proximity, and dispatches available AAVs accordingly. The docking station may further manage AAV charging, waste containment handling, and real-time fleet logistics to ensure continuous readiness and efficient resource utilization across multiple animals within its coverage area.

Together, these deployment configurations provide flexible scalability across diverse use environments—from single-animal residential implementations to multi-animal community systems—while maintaining consistent predictive responsiveness and automated waste management functionality.

Whether implemented as a single AAV or as a coordinated fleet, the navigation and deployment process ensures that at least one aerial vehicle arrives at the predicted site of waste elimination at or near the estimated time of the event. Upon arrival, the AAV transitions to the subsequent operational phase, which may include identifying the precise waste location, engaging the dual-mode collection mechanism, and performing either an interceptive collection (prior to ground contact) or a retrieval operation (post-deposition). The method thereby enables an integrated, autonomous, and predictive animal-waste management system capable of real-time response and efficient waste removal with minimal human intervention.

The control unit may utilize the positional data embedded in the predictive alert signal, as well as optional supplemental data such as inertial, visual, or environmental feedback, to optimize flight trajectory and arrival timing. Based on a comparison between the AAV's arrival time and the predicted elimination event, the control unit determines whether to operate the collection mechanism in the interceptive mode or the retrieval mode, as further described below.

Dual-Mode Collection Mechanism

A distinctive feature of the AAV is the inclusion of a dual-mode collection mechanism configurable between (i) an interceptive mode, wherein the AAV arrives prior to or during waste elimination and receives the waste directly from the animal, and (ii) a retrieval mode, wherein the AAV arrives subsequent to waste deposition and retrieves the waste from the ground or substrate.

Interceptive Mode:

In one embodiment, the interceptive mode is activated when the AAV arrives at the target location at or before initiation of the elimination event. In this mode, the collection mechanism comprises a deployable funnel-shaped receptacle or a flexible diaper-type bag adjustable in diameter to accommodate animals of varying sizes and positions, or to accommodate the various surface.

In certain implementations, the receptacle or diaper bag is positioned proximate to the hind portion of the animal to directly receive the discharged waste, thereby preventing contact between the waste and the ground. In another embodiment, the receptacle or flexible collection surface may be temporarily laid flat on the ground beneath the animal immediately prior to elimination. Upon completion, the receptacle may retract or fold for compact containment.

Retrieval Mode:

In another embodiment, the retrieval mode is activated when the AAV arrives after completion of the elimination process. In this configuration, the collection mechanism may comprise an articulable robotic arm equipped with a seal gripper unit. The seal gripper unit is configured to locate, grasp, and enclose the deposited waste and transfer the waste into the onboard containment unit. Preferably, the sealed gripper unit has a biodegradable liner.

In some embodiments, the retrieval mechanism may employ visual or olfactory sensors, or both, to detect and localize the deposited waste on varying surfaces. In one implementation, the receptacle or bag is attached to the AAV via a retractable rod or extension arm, which can extend outward from the containment chamber to deploy the collection device and subsequently retract to deposit the collected waste within the containment unit.

The vehicle control unit coordinates activation of the appropriate mode based on arrival timing and sensor feedback, thereby ensuring efficient waste capture regardless of timing variance relative to the elimination event.

Waste Containment and Disposal

In one embodiment, the AAV further comprises a containment unit configured to securely retain collected waste during flight and transport. The containment unit may include a sealed compartment, a removable cartridge, or a biodegradable receptacle housing, each designed to prevent leakage, odor, and contamination.

After completion of the collection operation, the AAV is configured to navigate autonomously to a designated disposal location, such as a docking station, waste receptacle module, or municipal waste container, where the contained waste is either automatically or manually offloaded. The AAV may communicate completion status or remaining capacity to a central monitoring system or to the animal's caretaker via a networked interface.

System Operation

In operation, the autonomous aerial vehicle serves as the responsive and dynamic component of the automated animal waste collection system. Upon receiving the predictive alert signal from the wearable monitoring assembly, the AAV autonomously determines an optimized flight path, navigates to the designated site, and selects the appropriate collection mode based on event timing. Through the integration of predictive detection, autonomous navigation, and adaptive collection capabilities, the AAV executes hygienic, efficient, and fully automated animal waste management with minimal human oversight.

Method of Operation

On a second aspect of the present invention, a method of operation of the Automated Animal Waste Collection System is described. The method comprises collecting, via a wearable assembly, location data and physiological data of an animal; analyzing the physiological data with a machine learning classification algorithm to distinguish a pre-elimination posture; upon identifying a high-probability waste elimination event, generating and transmitting a predictive alert signal comprising the geographical location of the animal and estimated target time of arrival; in response to the predictive alert signal, autonomously navigating an aerial vehicle to the geographical location; comparing a timing of arrival of the aerial vehicle relative to a waste elimination process; upon the arrival occurs during the waste elimination process, configuring a collection mechanism in an interceptive mode to directly receive discharged waste; upon the arrival occurs after the waste elimination process, configuring the collection mechanism in a retrieval mode to collect the waste deposited on a substrate; and storing the collected waste in a containment unit for subsequent disposal.

In one embodiment, a method is provided for collecting and processing location data and physiological data from an animal. The method is implemented through the use of a wearable monitoring assembly configured to be fitted directly onto the animal.

The method begins by providing the wearable monitoring assembly. The assembly includes a harness assembly having at least one adjustable strap that allows accommodation of animals of different sizes. Embedded within or attached to the harness is a power source comprising a rechargeable battery, and a sensor assembly operatively coupled to the power source. The sensor assembly is configured to generate both location data and physiological data corresponding to the animal during normal movement and activity.

In operation, the method comprises a step of collecting location data that is indicative of the geographical position of the animal. The collection of location data is achieved through a positional sensor incorporated within the sensor assembly. The positional sensor may comprise a Global Positioning System (GPS) module, an Inertial Measurement Unit (IMU) used alone or in conjunction with the GPS module, or a high-accuracy positioning module employing real-time kinematics (RTK) to achieve enhanced positional precision in dense or obstructed environments.

The method further comprises collecting physiological data that is indicative of a pre-elimination posture or biological state of the animal. The physiological data is generated by a biological activity sensor forming part of the sensor assembly. The biological activity sensor may include one or more sensing components, such as an IMU, a motion sensor or accelerometer, a temperature sensor, a gas sensor configured to detect volatile organic compounds (VOCs), or an imaging device or motion analysis camera. In certain embodiments, the biological activity sensor is disposed on a pulling member or tether portion of the harness assembly to enhance sensitivity to movement patterns associated with animal posture and pre-elimination behavior. In certain embodiments, the biological activity sensor is disposed on a hood member of the harness assembly to have more dedicated detection.

Once the location data and physiological data have been collected, the data are transmitted to an onboard processor integrated within the wearable monitoring assembly. The onboard processor executes a predictive model or a machine learning classification algorithm that analyzes the combined data to distinguish between pre-elimination postures and non-elimination activities. Based on this analysis, the processor generates an output signal or control data indicative of the likelihood or occurrence of an imminent elimination event by the animal.

When the analysis identifies a high-probability waste elimination event, the onboard processor initiates the alert generation process. In certain embodiments, the identification of such an event occurs when an internal probability or confidence threshold is exceeded. For example, the threshold may be set to correspond to an 80% or greater confidence level that an elimination event is imminent.

Upon identification of the high-probability event, the processor is configured to generate a predictive alert signal. The predictive alert signal comprises information necessary for initiating an appropriate response by an external waste collection or removal subsystem. The information contained within the predictive alert signal may include the geographical location of the animal, which is derived from the positional sensor, such as a GPS module. The alert signal may further include an estimated target time of arrival, or a time window associated with the predicted elimination event. In one example, the target time of arrival is estimated to be approximately five seconds prior to the anticipated onset of waste elimination. Optionally, the predictive alert signal may also comprise an identifier associated with the animal, such as an animal ID or unique device identifier, to enable correlation of data across system components.

The predictive alert signal is transmitted from the processor through a first communication module that is operatively coupled thereto. The first communication module may employ one or more wireless communication protocols including, but not limited to, LTE or 5G, LoRaWAN, Bluetooth Low Energy (BLE), or Wi-Fi Direct. In embodiments that employ a fixed infrastructure, the predictive alert signal is transmitted to a docking station configured to serve as a communication and dispatch node for one or more autonomous aerial vehicles (AAVs). In other embodiments, particularly in compact or remote systems, the alert signal is transmitted locally to an onboard compact AAV (AAV) using a low-power wireless communication protocol.

Following transmission of the predictive alert signal, the method proceeds with an autonomous navigation phase executed by an external autonomous aerial vehicle (AAV) or an associated control infrastructure operating in response to the received predictive alert signal. The AAV, or its corresponding docking station, includes a second communication module configured to receive the predictive alert signal. Upon receipt of the signal, the docking station or control infrastructure autonomously assigns the task to a suitable AAV The selection process may include determining the nearest available AAV having sufficient battery capacity and adequate waste containment capacity. In some embodiments, particularly in urban environments, the docking stations may be structurally integrated into buildings or other fixed installations to optimize accessibility and deployment efficiency.

Upon assignment, the selected AAV initiates navigation using its onboard vehicle control system. The vehicle control system is operatively coupled to both the second communication module and the AAV's propulsion system. The propulsion system is configured to support vertical takeoff and landing (VTOL), as well as hovering, forward flight, and precision landing operations. The vehicle control system autonomously navigates the AAV to the geographical location of the animal indicated by the predictive alert signal and coordinates the timing of the flight path with the estimated target time of arrival so as to ensure timely arrival relative to the predicted elimination event.

In typical implementations, navigation is achieved based on the location coordinates received in the predictive alert signal, such as GPS-derived coordinates. In complex or high-density environments, such as urban areas, the navigation system further accounts for potential obstacles, including but not limited to power lines, trees, and pedestrian movement. The AAV may employ real-time obstacle avoidance technologies, such as LiDAR-based or camera-based sensing and mapping systems, to safely navigate through such environments while adhering to predesignated urban-safe flight corridors.

In embodiments employing remote or portable systems, the compact AAV may automatically deploy from a portable carrying assembly prior to initiating navigation to the target location. The purpose of this autonomous navigation step is to achieve timely waste removal by ensuring that the AAV arrives at or near the animal's location immediately before, or shortly after, the animal's defecation event. Upon arrival, the system may further execute a comparison of the AAV's actual arrival time relative to the detected timing of waste elimination to determine whether to initiate an interceptive waste collection mode (where the receptacle is laid on the ground of where animal poop) or a retrieval mode (where waste is collected after deposition).

In various embodiments, the system implements one of two automated waste collection modes—interceptive collection or retrieval collection—depending on the timing of the AAV's arrival relative to the animal's elimination process.

In operation, in a first example, if the autonomous aerial vehicle arrives during, or immediately prior to completion of, the animal's waste elimination event, the vehicle's collection mechanism is automatically configured into an interceptive mode. In this configuration, the vehicle control unit, having navigated the AAV to the predicted location based on the previously generated predictive alert signal, activates the interceptive collection sequence. The collection mechanism is deployed proximate to the hind portion of the animal and positioned to directly receive the discharged waste material before it contacts the ground surface. The interceptive mechanism may include a deployable, funnel-shaped receptacle or a flexible, expandable collection bag formed from a lightweight, biodegradable or compostable material. The receptacle may be adjustable in diameter or length to accommodate different animal sizes and postures. The purpose of this configuration is to intercept the waste in mid-air, thereby preventing ground contamination and enabling hygienic capture at the source.

In a second example, if the autonomous aerial vehicle arrives during, or immediately prior to completion of, the animal's waste elimination event, the vehicle's collection mechanism is automatically configured into an interceptive mode. The collect mechanism will lay out a collect bag on the ground to receive the elimination from the animal. The collection bag will subsequently sealed and retrieve back into the contaminant unit of the AAV.

Alternatively, in a third example, when the vehicle arrives after completion of the elimination event, the system automatically transitions to a retrieval mode. In this configuration, the vehicle control unit reconfigures the collection mechanism to perform ground-based waste recovery. The retrieval mechanism may include an articulable robotic arm operatively coupled to a sealing gripper or scoop unit. Upon detecting the presence of deposited waste—either through onboard imaging sensors or surface detection algorithms—the robotic arm extends toward the substrate, grasps or scoops the deposited waste, and seals it within a biodegradable collection bag. The sealed bag is then automatically transferred to the vehicle's onboard containment unit for secure storage.

Following either interceptive or retrieval collection, the system proceeds to a waste storage and disposal phase. The autonomous aerial vehicle includes an enclosed containment unit configured to retain the sealed waste bag during flight. The containment unit may incorporate odor-control features, air-tight seals, or replaceable liners to maintain hygiene and prevent leakage during transport. Once the collection operation is complete, the vehicle control unit commands the AAV to navigate to a designated return or disposal location. In infrastructure-supported environments, such as residential communities, dog parks, or service centers, the AAV autonomously returns to a AAV Docking Station. At the docking station, the sealed waste bag is automatically offloaded into a larger waste receptacle or centralized waste containment system, or farm which may subsequently interface with municipal disposal, composting, or bio-waste recycling processes.

After disposal, the docking or base station may initiate a post-operation maintenance and reset sequence, during which the containment unit is sanitized or replaced, the rechargeable battery is replenished, and the collection mechanism is folded into its stowed configuration. The system may also log data from the completed collection cycle—such as time of collection, animal identifier, waste type, and environmental conditions—for subsequent analytics or compliance tracking. This information are beneficial for the animal owner to get general understanding about the animal's routine health.

Once maintenance and data synchronization are complete, the docking station transmits a readiness signal to the central control system or wearable assembly, indicating that the AAV is available for the next predictive alert event.

Autonomous Infrastructure Hub Centralized Orchestration Controller

In one embodiment, the autonomous infrastructure hub comprises a centralized orchestration controller configured to manage and coordinate a plurality of autonomous aerial vehicles (AAVs) within a defined geographic service region. The centralized orchestration controller may be implemented as a distributed computing architecture including one or more processors, memory modules, network interfaces, and a fleet-management database. In certain embodiments, the controller may operate as a cloud-connected node, an edge-computing station, or a hybrid configuration.

The orchestration controller is configured to execute a suite of computational models and optimization routines including, by way of example: spatial-temporal optimization algorithms for trajectory planning; kinetic modeling algorithms defining flight envelopes and maneuvering constraints for each AAV; probabilistic intercept scoring models for predicting interceptive success likelihood; energy-state forecasting models for projecting battery endurance and mission viability; and conflict-avoidance routing algorithms for ensuring safe multi-vehicle coordination.

Upon receipt of a predictive telemetry signal transmitted from the wearable monitoring assembly, the orchestration controller may execute a multi-stage dispatch protocol.

In one instance, the controller validates signal authenticity, verifies probability threshold criteria, and confirms temporal window parameters associated with the predicted elimination event. In another instance, the controller queries a real-time AAV status registry, which maintains continuously updated metadata for each AAV, comprising: current geographic position, velocity vector, remaining energy capacity, containment status, sterilization state, and firmware integrity state.

The orchestration controller may then calculate an estimated time-of-arrival (ETA) for multiple candidate AAVs relative to the projected elimination location. Based on these calculations, the controller may compute an interceptive probability score for each candidate AAV The interceptive probability score may be derived from a composite function incorporating: predicted arrival time relative to the projected temporal window, AAV kinetic state, environmental constraints, historical intercept performance metrics.

The controller may then select at least one optimal AAV based on a weighted optimization model that accounts for proximity, remaining energy capacity, predicted intercept success probability, current airspace congestion, and potential overlapping dispatch requests.

Spatial-Temporal Conflict Resolution

In certain embodiments, the orchestration controller performs dynamic trajectory modeling across all active AAVs operating within the service region.

The spatial-temporal conflict resolution algorithm may model projected future trajectory vectors for each active AAV over a defined prediction horizon. Based on these projections, the controller may allocate discrete altitude corridors, micro-airspace lanes, or segmented time windows to ensure non-overlapping trajectories.

In one example, if two AAVs are predicted to traverse an intersecting waypoint within overlapping temporal intervals, the controller may: adjust altitude separation between vehicles, introduce a controlled delay to a lower-priority mission, re-route one AAV through an alternative path, modify velocity profiles to prevent convergence. Priority weighting may be determined based on intercept probability confidence, elimination imminence, or mission criticality. This spatial-temporal coordination framework enables scalable fleet operation in dense environments such as residential neighborhoods, public parks, or mixed pedestrian corridors.

Off-Board Predictive Modeling

In some embodiments, the autonomous infrastructure hub performs off-board predictive modeling to supplement and refine predictions generated by the wearable monitoring assembly.

For example, the hub may aggregate historical behavioral data for a specific animal and perform centralized machine learning inference to refine: elimination probability scores, projected temporal windows, expected posture alignment parameters, morphological positioning characteristics for interceptive deployment, surface classification predictions derived from terrain history.

The refined modeling outputs may be transmitted to the selected AAV as mission metadata. Such metadata may include updated intercept thresholds, substrate classification indicators, and recommended capture-surface geometry adjustments. This distributed inference architecture permits continuous model improvement while reducing computational burden on the wearable assembly.

Docking Array and Kinetic-Ready State

In one embodiment, the autonomous infrastructure hub comprises a docking array including a plurality of individually addressable docking ports. Each docking port may comprise: inductive or conductive charging interfaces, mechanical retention latches, data transfer connectors, automated waste cartridge receptacles, sterilization chamber interfaces.

An AAV may be designated as being in a kinetic-ready state when a predefined set of operational criteria are satisfied. In one instance, these criteria include: battery charge exceeding a predefined threshold; containment unit emptied and hermetically sealed; collection mechanism sterilized; firmware integrity verified; communication link validated. The orchestration controller may continuously monitor these parameters and maintain a readiness index for each AAV to ensure immediate dispatch capability.

Automated Offloading Module

In certain embodiments, the hub further comprises an automated offloading module configured to receive collected waste from a returning AAV The automated offloading module may include: a simple trach container with sensor activated open cover, a robotic transfer interface configured to engage a containment cartridge or docking port; a vacuum-assisted waste transfer conduit; a centralized sealed waste reservoir; an odor-neutralization subsystem incorporating activated carbon or chemical filtration; a fluid drainage channel, where applicable.

Upon docking confirmation, an automated offloading sequence may be initiated. The sequence may comprise: 1) mechanical coupling of the AAV to the hub interface; 2) unlocking of a containment interface gate; 3) transfer of collected waste into centralized storage; 4) resealing of the AAV containment chamber; and 5) verification of leak integrity.

The sequence may be fully automated without human intervention.

Sterilization and Decontamination

In one embodiment, the hub comprises a sterilization module configured to perform automated decontamination of the AAV collection mechanism and associated surfaces following offloading. The sterilization module may employ one or more of: ultraviolet-C (UV-C) irradiation; atomized disinfectant spray; ozone-based sanitization; thermal sterilization cycles. The sterilization process may selectively target: the multi-modal collection mechanism; articulable effector joints; interior containment surfaces; external surfaces exposed during collection. In certain embodiments, sterilization parameters may be dynamically adjusted based on contamination level detection.

Energy Lifecycle Management

In certain embodiments, the charging subsystem of the hub includes adaptive charging rate control circuitry configured to optimize battery longevity and rapid readiness. The system may further comprises: battery health diagnostics, charge-cycle tracking, predictive maintenance scheduling, automated battery-swapping robotics in alternative embodiments. The orchestration controller may forecast energy demand patterns based on historical elimination timing data and reserve high-capacity AAVs for predicted peak activity intervals.

Smart-City Interface

In some embodiments, the autonomous infrastructure hub interfaces with external smart-city or municipal data networks. Through such interface, the hub may ingest: atmospheric condition data (e.g., wind speed, precipitation, temperature); pedestrian density heatmaps; temporary no-fly zone notifications; emergency or hazard alerts.

The orchestration controller may dynamically modify AAV trajectory, altitude, speed, or dispatch timing based on such environmental metadata. For example, wind vector data may be incorporated into trajectory optimization models to reduce energy consumption, while pedestrian density data may be used to elevate flight altitude over congested areas.

Collectively, the foregoing embodiments provide structural and algorithmic support for centralized orchestration, dynamic fleet management, energy lifecycle control, sterilization integration, and environmental adaptation within a distributed autonomous sanitation infrastructure system.

EXEMPLARY EMBODIMENTS

In certain embodiments, the wearable monitoring assembly disposed on the animal further comprises a positional tracking module, such as a GPS receiver, configured to provide precise real-time location data of the animal. The inclusion of the GPS module enables the autonomous aerial vehicle (AAV) to navigate accurately to the animal's location with minimal or no human intervention, thereby supporting fully autonomous operation.

However, in other embodiments where the animal is accompanied by its owner during outdoor activity (for example, during routine walks), the owner's mobile device—such as a smartphone—may function as a substitute or proxy for the GPS module. In such configurations, the system leverages the location data from the owner's device, which remains in close proximity to the animal, to determine the animal's position and to coordinate the AAV's navigation and collection tasks.

This design flexibility allows the system to optimize cost, power consumption, and form factor of the wearable monitoring assembly, while maintaining accurate geolocation functionality across both autonomous and owner-accompanied use cases.

In yet another embodiment, the system is further configured to enable owner-initiated operation of the autonomous aerial vehicle (AAV) in circumstances where the animal is not equipped with the wearable monitoring assembly. Such scenarios may occur, for example, when the owner inadvertently omits to attach the harness assembly prior to an outdoor excursion, or when the animal exhibits discomfort or reluctance to wear the harness.

In this configuration, the owner may manually initiate a waste collection request through an associated mobile application or user interface. Upon receipt of the owner's request, the system is configured to determine the approximate location of the waste based on positional data from the owner's mobile device or user input. The nearest available AAV is then dispatched from a designated docking station or portable base to autonomously navigate to the specified location and perform the waste retrieval operation using its retrieval-mode collection mechanism, as previously described.

The versatility of the invention allows for its implementation in a variety of environments. The following exemplary embodiments are provided for illustrative purposes and are not intended to be exhaustive.

Example Embodiment: Urban High-Density Deployment for Residential Sidewalks

In a further embodiment, the automated animal waste removal system is configured for deployment within high-density urban environments, such as residential neighborhoods and pedestrian sidewalks in metropolitan areas including New York City. In this embodiment, the system utilizes building-integrated or block-level AAV docking stations strategically positioned on rooftops, terraces, or municipal structures such as light poles or transit shelters.

Each docking station houses a plurality of autonomous aerial vehicles (AAVs) designed for vertical takeoff and landing within confined urban airspace. The docking station further comprises charging bays equipped with automated power management circuitry, a centralized waste containment system for interim storage, and a wireless communication hub that interfaces with local pet-owner networks, building management systems, or municipal data platforms.

Each animal operating within the system's coverage area is fitted with a wearable monitoring assembly as previously described. The assembly includes a positional sensor—such as a GPS unit enhanced with real-time kinematics (RTK) capability for improved positional accuracy in urban canyon conditions—a suite of biological activity sensors such as IMUs, VOC detectors, and motion-analysis cameras, and an onboard processor trained to detect pre-defecation posture using machine-learning models. When the wearable monitoring assembly identifies a high-probability elimination event, it transmits a predictive alert signal via a wide-area communication link such as LTE, 5G, or Wi-Fi to the nearest building-integrated docking station.

Upon receipt of the predictive alert signal, the docking station autonomously assigns one of its available AAVs based on proximity, battery level, and containment capacity. The selected AAV initiates navigation along urban-safe flight corridors, dynamically accounting for environmental constraints such as power lines, building facades, pedestrian pathways, and vehicular traffic. The navigation process incorporates real-time obstacle detection and avoidance using LiDAR sensors, stereo or depth cameras, and adaptive path-planning algorithms.

The AAV's dual-mode collection mechanism operates as follows. In the interceptive mode, when the AAV arrives prior to or during elimination, a deployable receptacle or bags on the area thereby preventing contamination of the sidewalk surface. In the retrieval mode, when arrival occurs after elimination, the AAV employs an articulable robotic arm with a sealing gripper to retrieve the deposited waste hygienically and deposit it into a sealed containment compartment onboard the vehicle.

Following collection, the AAV autonomously returns to its assigned docking station. The sealed waste bag is automatically transferred from the AAV's containment compartment into the docking station's centralized waste bin, which is configured for periodic removal by municipal sanitation services or automated waste-handling systems.

Optionally, the system may integrate with residential building management software or municipal smart-city infrastructure, enabling extended data interoperability. Such integrations may provide waste removal confirmations to dog owners, predictive analytics for optimizing municipal sanitation routes, and real-time environmental cleanliness dashboards accessible to city authorities or maintenance personnel.

This embodiment enables an efficient, hygienic, and scalable waste removal system specifically tailored to densely populated urban environments, thereby improving public sanitation, reducing manual cleaning labor, and supporting broader smart-city sustainability initiatives.

Embodiment: Compact AAV System for Remote Hiking Trails

In another embodiment, the automated animal waste removal system is adapted for deployment in remote or low-density environments such as hiking trails, open fields, or rural areas, where permanent AAV docking stations may be impractical due to cost, terrain constraints, or limited service demand. In this configuration, the autonomous aerial vehicle (AAV) is implemented as a compact, foldable AAV that can be carried in portable carrying assembly.

The portable carrying assembly may be configured in various ways depending on user preference and environmental conditions. In certain embodiments, the carrying assembly is secured to the animal through an extended harness arrangement. In alternative embodiments, the assembly is designed to be carried by the animal's owner, such as within a backpack, or mounted on a vehicle positioned near the trailhead.

The compact AAV can be released by the request of the owner, pick the waste and send the waste away. The AAV and its carrying assembly operate on an integrated rechargeable battery system, ensuring full autonomy during remote use. Optionally, the system may synchronize with a mobile application configured to provide user interface functions, including confirmation of successful waste collection, battery charge status, containment capacity notifications, and GPS-based logging of collection events for operational history and route tracking.

This embodiment thereby provides a cost-effective, portable, and environmentally responsible solution for autonomous animal waste management in remote or semi-wild settings, maintaining the full functional integrity of the broader automated system while eliminating dependence on stationary infrastructure.

The invention claimed is:

1. A distributed infrastructure system for predictive and automated animal waste management, the system comprising:

a wearable monitoring assembly configured to be coupled to an animal, the wearable monitoring assembly comprising a sensor assembly and an edge-computing processor configured to:

generate a high-fidelity data stream indicative of the animal's physiological state and postural kinematics;

execute a predictive machine learning model on the data stream to identify a latent intent for a waste elimination event; and broadcast a predictive telemetry signal comprising a geographical coordinate, a probability threshold, and a projected temporal window for the event;

an autonomous infrastructure hub comprising a docking array and a centralized orchestration controller, the hub configured to:

maintain a plurality of autonomous aerial vehicles (AAVs) in a kinetic-ready state within the docking array;

monitor energy-state metadata and spatial proximity for each of the plurality of AAVs; and perform dynamic resource allocation by dispatching at least one selected AAV from the docking array in response to the predictive telemetry signal, wherein the dispatch is optimized based on a spatial-temporal conflict resolution algorithm to ensure non-overlapping flight trajectories; and the plurality of autonomous aerial vehicles (AAVs), each comprising:

a variable-configuration propulsion system;

a multi-modal waste collection mechanism configurable between an interceptive mode utilizing a deployable capture-surface to receive waste in-situ during elimination; and a retrieval mode utilizing an articulable effector to collect waste from a substrate post-deposition; and a vehicle control unit configured to autonomously navigate to the geographical coordinate and dynamically toggle the collection mechanism between the interceptive mode and the retrieval mode based on a real-time comparison between the AAV's time-of-arrival and the state of the waste elimination event;

wherein the autonomous infrastructure hub further comprises an automated offloading module configured to receive and consolidate waste from the plurality of AAVs and a charging subsystem configured to manage an energy lifecycle of the plurality of AAVs to ensure continuous operational availability.

2. The system of claim 1, wherein the wearable monitoring assembly further comprises:

a harness assembly comprising at least one adjustable attachable means to accommodate different animal morphologies;

the sensor assembly comprising a positional sensor for geographical location and a biological activity sensor suite, the suite comprising one or more of: an inertial measurement unit (IMU), a motion sensor, a thermal sensor, a gas sensor for detecting volatile organic compounds (VOCs) indicative of pre-elimination chemistry, and an imaging device; and wherein the edge-computing processor is further configured to execute a machine learning classification algorithm trained on multi-modal postural and biological signals to distinguish a pre-elimination posture from non-elimination activities and identify high-probability elimination signatures.

3. The system of claim 1, wherein each of the plurality of autonomous aerial vehicles (AAVs) further comprises:

a multi-axial propulsion system configured for high-precision hovering and vertical takeoff and landing (VTOL);

a localized containment unit for storage of collected waste;

a wireless transceiver, comprising one or more of an LTE transceiver, a 5G transceiver, a LoRaWAN transceiver, a Bluetooth Low Energy (BLE) transceiver, and a Wi-Fi Direct transceiver, the wireless transceiver configured to receive the predictive telemetry signal from the wearable monitoring assembly or the autonomous infrastructure hub; and the vehicle control unit configured to receive instruction from the hub including off board spatial-temporal modeling to determine a probability of interceptive success versus retrieval necessity based on the AAV's current kinetic state and the projected temporal window to make a decision about a fly path.

4. The system of claim 1, further comprising a notification element comprising at least one of a speaker, a visual indicator, and a vibration motor, the notification element operatively coupled to at least one of the wearable monitoring assembly or the AAV, the notification element configured to provide a multi-sensory confirmation cue—selected from haptic, auditory, or visual modalities—to a human caretaker indicating that a dynamic resource allocation has been initiated.

5. The system of claim 1, wherein the interceptive mode of the multi-modal waste collection mechanism comprises a deployable funnel-shaped receptacle or a flexible, variable-diameter diaper bag configured to undergo dynamic geometric adjustment to match the specific dimensional profile of the ground cover during the elimination event.

6. The system of claim 1, wherein the retrieval mode of the multi-modal waste collection mechanism comprises an articulable robotic arm featuring a sealing gripper unit, the arm being configured to:

perform a computer-vision-guided grasp of deposited waste;

cover said waste within a biodegradable substrate; and transfer the covered waste into the containment unit for consolidated offloading at the infrastructure hub.

7. The system of claim 1, wherein the predictive telemetry signal is optimized to achieve a dispatch trigger at least five seconds prior to the waste elimination event with a probability threshold exceeding 80%, thereby ensuring a high-confidence interceptive-mode deployment.

8. The system of claim 1, wherein the centralized orchestration controller of the autonomous infrastructure hub is further configured to ingest historical routine data and animal-specific behavioral baselines to iteratively update the predictive machine learning model, thereby providing individualized diagnostic accuracy for a plurality of distinct animals.

9. The system of claim 1, wherein the wearable monitoring assembly further comprises a pulling member comprising a leash or a harness lead, and the biological activity sensor suite is disposed on or within a segment of the pulling member to capture biomechanical tension and frequency data indicative of animal pre-elimination behavior.

10. The system of claim 1, wherein each of the plurality of AAVs further comprises a miniature camera and an onboard image processor configured to execute simultaneous localization and mapping (SLAM) and object recognition to identify the animal's hind portion and distinguish waste from environmental substrate in real-time.

11. The system of claim 1, wherein the autonomous infrastructure hub comprises a sterilization module configured to perform automated chemical or ultraviolet-C (UV-C) decontamination of the AAV collection mechanisms post-offloading to maintain sanitary integrity within the plurality of AAVs.

12. The system of claim 1, wherein the hub's centralized orchestration controller is configured to interface with a smart-city network to receive environmental metadata, enabling the hub to adjust AAV flight trajectories based on local atmospheric conditions or human pedestrian density.

13. A method for predictive and automated animal waste management within a distributed infrastructure environment, the method comprising:

at a wearable monitoring assembly coupled to an animal:
- generating a high-fidelity data stream indicative of the animal's physiological state and postural kinematics;
- executing a predictive machine learning model on the data stream to identify a latent intent for a waste elimination event; and
- broadcasting a predictive telemetry signal comprising a geographical coordinate, a probability threshold, and a projected temporal window for the waste elimination event;

at an autonomous infrastructure hub managing a plurality of autonomous aerial vehicles (AAVs):
- maintaining the plurality of AAVs in a kinetic-ready state within a docking array;
- monitoring energy-state metadata and spatial proximity for each of the plurality of AAVs; and
- performing dynamic resource allocation by dispatching at least one selected AAV from the docking array in response to the predictive telemetry signal, wherein the dispatching is optimized via a spatial-temporal conflict resolution algorithm to ensure non-overlapping flight trajectories;

via the dispatched autonomous aerial vehicle (AAV):
- autonomously navigating to the geographical coordinate based on the predictive telemetry signal;
- evaluating the current state of the waste elimination event; and
- dynamically toggling a multi-modal waste collection mechanism between (i) an interceptive mode to receive waste in-situ via a deployable capture-surface and (ii) a retrieval mode to collect waste from a substrate via an articulable effector, based on the results of the temporal analysis; and at the autonomous infrastructure hub, post-collection:
- executing an automated offloading sequence to receive and consolidate waste from the AAV into a centralized containment module; and
- initiating a charging cycle to manage an energy lifecycle of the AAV, thereby restoring the AAV to a kinetic-ready state for subsequent dispatch.

14. The method of claim 13, further comprising:
- generating the high-fidelity data stream via a sensor assembly integrated into a multi-strap harness; and capturing one or more of:
- inertial measurement unit (IMU) data, thermal data, volatile organic compound (VOC) concentrations, and biomechanical tension and frequency data via a biological activity sensor suite disposed on a pulling member to identify chemical and kinematic signatures unique to pre-elimination physiology.

15. The method of claim 13, further comprising:
- ingesting historical routine data and animal-specific behavioral baselines into the centralized orchestration controller; and
- iteratively updating the predictive machine learning model to enhance individual diagnostic accuracy across a plurality of distinct animals.

16. The method of claim 13, wherein performing the real-time temporal analysis further comprises: modeling the AAV's kinetic state relative to the projected temporal window of the elimination event to calculate an interceptive probability score; and optimizing the broadcasting of the predictive telemetry signal to occur at least five seconds prior to the waste elimination event.

17. The method of claim 13, wherein configuring the multi-modal waste collection mechanism in the interceptive mode further comprises: performing a dynamic geometric adjustment of a deployable capture-surface to align its dimensional profile with the specific morphology of the animal during the elimination event.

18. The method of claim 13, wherein configuring the multi-modal waste collection mechanism in the retrieval mode further comprises: executing simultaneous localization and mapping (SLAM) and object recognition via an AAV-mounted camera to identify anatomical markers and distinguish waste from environmental substrate; executing a computer-vision-guided robotic grasp of the waste; and encapsulating the waste within a biodegradable substrate.

19. The method of claim 13, further comprising: subjecting the multi-modal waste collection mechanism to an automated chemical or ultraviolet-C (UV-C) decontamination sequence at the autonomous infrastructure hub post-offloading.

20. The method of claim 13, further comprising: interfacing the autonomous infrastructure hub with a smart-city network to adjust AAV flight trajectories based on local atmospheric conditions or human density; and initiating a configurable multi-sensory notification—comprising haptic, auditory, or visual signals—via the wearable monitoring assembly or the AAV.

* * * * *